United States Patent [19]
Dye

[11] Patent Number: 5,684,941
[45] Date of Patent: Nov. 4, 1997

[54] INTERPOLATION RENDERING OF POLYGONS INTO A PIXEL GRID

[75] Inventor: Thomas Anthony Dye, Austin, Tex.

[73] Assignee: Cirrus Logic, Inc., Fremont, Calif.

[21] Appl. No.: 702,868

[22] Filed: Aug. 28, 1996

Related U.S. Application Data

[63] Continuation of Ser. No. 333,841, Nov. 3, 1994, abandoned, which is a continuation-in-part of Ser. No. 299,739, Sep. 1, 1994.
[51] Int. Cl.$^6$ ................................................. G06F 15/00
[52] U.S. Cl. ................................................. 395/141
[58] Field of Search ................................. 395/141, 142, 395/143; 345/113, 114, 118

[56] References Cited

U.S. PATENT DOCUMENTS

| | | | |
|---|---|---|---|
| 5,438,656 | 8/1995 | Valdés et al. | 395/143 |
| 5,450,534 | 9/1995 | Ichikawa | 395/133 |

OTHER PUBLICATIONS

*Texas Instruments TMS34010 User's Guide*, 1988, pp. 1-1–4-17.

Primary Examiner—Phu K. Nguyen
Attorney, Agent, or Firm—Stanford & Bennett

[57] ABSTRACT

Interpolation method and apparatus for rendering polygons into a pixel grid. A software driver receives vertices of each polygon and identifies a main slope traversing the vertical extent of the polygon, where the other sides are opposite slopes. The software driver determines initial and incremental width values for width interpolation, rather than edge walking the opposite slopes. The interpolator logic includes a width counter for loading the width value, so that each orthogonal scan line is complete when the width counter reaches terminal count rather than comparing each pixel with the opposite slope. An interpolation procedure thus allows randomly-oriented triangles and other polygons having a main slope, up to two opposite slopes and up to three orthogonal sides to be drawn in a single command. Tessellation of general coplanar polygons is also simplified, where the software driver preferably divides the polygon into randomly-oriented triangles rather than further dividing the polygon into orthogonally-oriented triangles as was done in prior art. Thus, the interpolation method simplifies the logic and provides faster interpolation for polygons.

22 Claims, 12 Drawing Sheets

INTERPOLATION RENDERING OF POLYGONS INTO A PIXEL GRID

CROSS-REFERENCES TO RELATED APPLICATION

This is a continuation of application Ser. No. 08/333,841, Nov. 3, 1994, now abandoned, which is a continuation-in-part of application Ser. No. 08/299,739 filed on Sep. 1, 1994 entitled "Incremental Orthogonal Error Correction for 3D Graphics."

APPENDIX

The present disclosure includes Appendix A which is a partial source code listing of a software driver used to perform calculations described herein.

1. Field of the Invention

The present invention relates to graphics, and more particularly to a method and apparatus for interpolating polygons into a pixel grid.

2. Description of the Related Art

The advent of substantial hardware improvements combined with standardized graphics languages has allowed the use of complex graphics functions in even the most common applications. For example, word processors, spread sheets and desktop publishing packages are now beginning to take full advantage of the improvements in graphics capabilities to improve the user interface. Although sophisticated graphics packages have been available for computer aided drafting, design and simulation for some time, three-dimensional (3D) displays are now common in games, animation, multimedia communication and drawing packages designed for personal computers.

It is evident that the demand for greater graphic capabilities has increased dramatically. Thus, graphic systems must be capable of performing more sophisticated functions in less amount of time in order to process greater amounts of graphical data required by modern software applications. There is a continuing need for improvements in software algorithms and hardware implementations to draw three-dimensional objects using full color, shading, texture mapping, and transparency blending.

The development of raster display systems dramatically reduced the overall cost and increased the capabilities of graphic systems. In a raster display system, a set of horizontal or orthogonal scan lines, each comprising a row of pixels, forms an array or grid of pixels to represent the entire screen area. The screen is preferably a cathode ray tube or LCD display or the like capable of scanning the entire pixel grid at a relatively high rate to reduce flicker as much as possible. The pixel data is preferably stored in a frame buffer comprising dynamic random access memories (DRAMs), or more preferably video RAMs (VRAMs), where each pixel is represented by one or more bits depending upon the desired resolution. Typical display systems can draw screens with multiple colors at a variety of screen resolutions, such as 640×480, 800×600, 1024×768, 1280×1024 or more pixels depending upon the software drivers and the hardware used.

A video controller scans and converts the pixel data in the frame buffer to the control signals required by the screen system to display the information on the screen. In particular, the video controller scans each of the pixels sequentially, preferably from top to bottom and from left to right, and converts pixel data into intensity values for corresponding pixels on the screen. In a color graphics system using a CRT, three separate beams are controlled for each of the primary colors, where the intensity of each of the beams is determined by the pixel value corresponding to the respective colors. A similar system is used for LCD displays. In the preferred embodiment, each pixel value comprises 24 bits, one byte for each of the primary colors red, green, and blue, where the byte number determines the intensity of the respective color.

Other improvements have been made in the hardware realm, including graphics processors and accelerators with corresponding software drivers where the drivers interface between the host central processing unit (CPU) and the graphics processor. In general, the software driver receives information for drawing objects on the screen, calculates certain basic parameters associated with the objects and provides these to the graphics processor. The software driver then sends a command for the graphics processor to draw the object into the frame buffer. A graphics processor may use interpolation techniques where the fundamental information for the object to be drawn comprises a series of initial and incremental parameters or values. The graphics processor loads or otherwise receives the initial parameters for a first pixel, and then interpolates the object by incrementing the parameters until the object is complete. The parameters include x, y values to identify or locate each pixel on the screen.

There has also been an advance in graphics software such as the development of graphics standards. In particular, 3D core graphics system (CORE) was produced by ACM SIG-Graph Committee in 1977. Subsequently, the graphics kernel system (GKS), similar to CORE, became the first standardized graphics specification. Other more sophisticated standards developed, such as programmer's hierarchical interactive graphics systems (PHIGS). PHIGS has been extended with a set of features for pseudo-realistic rendering of objects on raster displays, called PHIGS-plus. Another graphics package developed called SPHIGS (simple PHIGS), which is a subset of PHIGS that supports some of the simpler PHIGS-plus features.

In spite of the high resolutions and speed of raster graphics, several inherent problems exist when drawing primitive geometric shapes, such as lines, circles and arcs onto a raster display. In particular, diagonal lines appear jagged because of an undesirable effect known as aliasing, or otherwise known as "the jaggies" or staircasing. In fact, the diagonal or curved edges of most geometric objects produced on a raster display have a certain degree of staircasing since the raster display is digital in nature, where partial pixels cannot be drawn. Thus, each pixel is either drawn or not drawn for an object. Several solutions are available to at least reduce the amount of aliasing or staircasing on the display. One solution is to increase the resolution of the display so that more pixels are available to draw each of the graphics primitives. However, this increases the cost and complexity of the hardware. In particular, increased resolution requires a greater amount of memory to store the graphic image as well as a faster video controller to convey the graphic data to the screen. An increase in hardware complexity not only adds to the cost but also consumes valuable space and power, which is often prohibitive in portable or laptop computers.

Drawing techniques have also been used to reduce aliasing, such as anti-aliasing and various scan conversion and rasterization techniques. For example, unweighted area sampling is an anti-aliasing technique used for drawing lines, where each line is considered to have a certain width thereby forming a rectangle and each pixel is shaded using various shades of grey or different intensities of color corresponding to the area of the pixel that the rectangle covers. Scan conversion techniques have also been applied to circles, rectangles, text strings, as well as other geometric objects. One particular algorithm was developed by Bresenham, which is advantageous since it uses only integer arithmetic, thereby avoiding complicated arithmetic functions. Bresenham's incremental technique may be applied to the integer computation of circles as well as other geometric shapes. Interpolated shading techniques have also been developed where shading information is computed for each polygon vertex and interpolated across the polygon to determine the shading at each pixel. One particular technique is known as Gouraud shading.

In spite of the existing improvements and developments, one particular problem area is drawing multiple-sided, coplanar polygons with shading along their surfaces. To achieve shading along the surface of the polygon in both the orthogonal and vertical directions, an initial color intensity value is provided and incremental intensity values are supplied for both directions. Since the object is usually interpolated while being drawn on a raster display, however, a certain amount of error exists between the characteristics of the theoretical object being drawn and the rasterized realization of the object into pixels. When the polygon is drawn beginning along an initial side that is not purely horizontal, vertical or diagonal, the conversion of the interpolated data into a rasterized or pixel grid display results in an accumulation of error from one orthogonal scan line to the next. This occurs because the memory of the display is limited and because all objects must be mapped to the pixel grid comprising pixels with defined boundaries, so that each pixel covers a small area of the object rather than a single point. Slight variations of the area covered from one scan line to the next causes an unrepresented accumulation of error. Consequently, when the initial side of the polygon crosses a column boundary so that the next orthogonal scan line jumps or begins one column over while drawing the polygon, the accumulation of error causes a large variation in characteristic values between vertically adjacent pixels. This is especially true if the intensity or color gradient along the orthogonal axis is relatively large, resulting in a banding effect where the shading appears non-monotonic. The banding effect occurs with color intensity, for example, because darker pixels are aligned next to lighter pixels on adjacent scan lines.

A similar banding effect problem arises when alpha-blending for transparency and when applying texture mapping to surfaces of polygons. In general, alpha blending is achieved by blending or combining the pixel values of an object in the foreground with the pixel values of an object in the background so that the foreground object appears transparent. Although less obvious, errors in the alpha values cause the transparency gradient to appear non-monotonic across the surfaces of the polygon. Likewise, errors in texture mapping cause similar irregularities, especially at the object edges.

These problems are exacerbated in a 3D display, especially when an object in one plane intersects an object of another, where both objects have a common intersection line. Although the depth value is actually a third coordinate, similar to x,y values for the orthogonal and vertical coordinates, respectively, the depth value will be considered throughout this disclosure as a pixel characteristic rather than a coordinate since all objects are mapped to a 2D pixel grid. The depth value or characteristic is only used to determine whether a pixel is in front of or behind a corresponding pixel of another object, which determines whether the pixel is drawn or not. Otherwise, the depth values have no visual effect on the pixels. Of course, the alpha values modify this somewhat in that a certain percentage of background and foreground pixels are blended for transparency effect. The buildup of error in the depth values along an intersection line between two objects in 3D space causes the line to appear jagged rather than straight. The eye is particularly sensitive to these irregularities, resulting in a less-pleasing display.

Such polygon drawing or interpolation errors have heretofore been ignored or tolerated. It is therefore desirable to provide a way to correct or minimize errors in the characteristics of the pixels that occur or otherwise accumulate while interpolating polygons onto a pixel grid array.

Improvements are also desired in the techniques used for drawing polygons. Randomly-oriented triangles, for example, were "tessellated" by splitting the triangle into two orthogonally-oriented, smaller triangles and separately interpolating the two smaller triangles. Orthogonally-oriented triangles are merely a subset of randomly-oriented triangles except restricted to include a "flat" or purely horizontal (orthogonal) base or top side aligning with the orthogonal scan lines of pixels. A software driver determined a horizontal dividing line forming the two separate triangles, and then calculated interpolation parameters and provided these parameters to interpolator logic. As a result of this procedure, the software driver sent two separate commands to the interpolation logic, which correspondingly interpolated two separate triangles. Interpolating two separate triangles in this manner was costly in terms of expense and speed since additional logic and extra time is required. Two separate passes through the interpolators slowed down the process since the interpolators had to be reloaded for the second triangle.

The interpolation technique was also relatively slow. Two separate interpolators were used to walk the edges of each triangle, one for a first side and one for an opposite side, which resulted in a starting point and an endpoint for each orthogonal scan line. The starting point was loaded into a counter and a comparator compared the endpoint value with the contents of the counter for each pixel in the current scan line. The comparator added cost and slowed down the entire interpolation process. For more generalized polygons, the software driver performed a tessellation or triangularization procedure for dividing the polygon into a plurality of orthogonally-oriented triangles. FIG. 8A illustrates the tessellation procedure of prior art, where a seven-sided polygon is divided into ten different triangles. Such tessellation procedure was relatively slow and complicated. Again, the software driver then provided corresponding parameters of the triangles to interpolator logic, which drew each of the triangles separately. Also, the same interpolation technique described above was used to draw each triangle, requiring the same comparison operation for each pixel.

It is desired, therefore to simply and substantially reduce the interpolation process for interpolating polygons into a pixel grid.

SUMMARY OF THE INVENTION

In an interpolation method according to the present invention for drawing polygons, randomly-oriented triangles need not be further divided and are interpolated directly with a single command. Other polygons having a main slope, a maximum of two opposite slopes and up to three orthogonally-oriented sides are also drawn with a single command. A software driver receives vertex information and identifies a main slope traversing the vertical, or "reference", dimension of the polygon. The other two sides are referred to as opposite slopes. The polygon is interpolated using orthogonal scan lines of pixels from the main slope to the opposite slopes, so that the reference coordinate, or y parameter, is preferably incremented or decremented by one for each scan line. A slope value for the main slope thus becomes the orthogonal component of the main slope, or the change in the orthogonal or x parameter with each unity increment of the y parameter.

The software driver determines initial and incremental width values and interpolates the width rather than edge walking the opposite slopes. The interpolated width value is then loaded into a counter and decremented for each pixel in the current scan line. When the width counter becomes zero or otherwise reaches terminal count, the counter asserts a terminal count signal indicating that the line is complete. In this manner, extra logic such as a comparator is not required to determine when the current line is completed. In the preferred embodiment, width and corresponding count values are defined for each opposite slope. Separate registers are provided to hold the opposite width values for the second half of the polygon, where these values are loaded into the width interpolator when the first half of the polygon is completed. Multiplexor logic is preferably added to switch to the separate registers to access the second half parameters after the first half of the polygon is completed. In this manner, interpolation is performed once for the entire polygon rather than for two separate polygons. This results in faster interpolation of polygons, including randomly-oriented triangles.

A substantial benefit of an interpolation method according to the present invention is the improved tessellation or triangularization of general polygons. General polygons are those polygons having more than three sides that do not have a single main slope and must be drawn with more than one command. In an interpolation method according to the present invention, the tessellation process for general polygons is simplified by dividing the polygon into randomly-oriented triangles rather than into orthogonally-oriented triangles of prior art. The software driver then passes a command for each triangle to the interpolation logic according to the present invention. The present invention therefore allows a substantial reduction in the number of triangles required for each polygon.

In the preferred embodiment, the present invention is used for filling multiple-sided, randomly oriented, coplanar polygon surfaces in three dimensions, where the polygons have intensity shading, depth and alpha-blending. The software driver receives vertex information for drawing a polygon and calculates a set of fundamental parameters comprising initial and incremental values for each desired characteristic of the object. The parameters include initial x,y coordinates of a base point and an initial width of the polygon corresponding to the base point, and initial values for each of the desired characteristics, including intensity, alpha, and depth values for the base point. Furthermore, the parameters include slope or incremental values for each of the x, y, width, intensity, depth and alpha parameters used for interpolation. These parameters, along with a corresponding command, are then provided to a register file within a graphics processor implemented according to the present invention. The graphics processor loads the parameters into an interpolator and draws the polygon according to the command and the parameters.

All of the parameters preferably include integer and fractional portions for accuracy. However, due to the preferred use of video random access memories (VRAMs) to form the pixel grid and to achieve the desired speed, the incremental y parameter is preferably unity when interpolating polygons into a pixel grid. The incremental x value is the change of the x value corresponding to the unity increment of the y value along a primary edge or main slope, which spans the entire vertical dimension of the polygon. Also, the parameters include a count value representing the number of orthogonal scan lines used to draw the polygon.

The parameters calculated by the software driver include incremental error values for each characteristic to be corrected. In the preferred embodiment, the intensity and depth characteristics are corrected although the same principle could be applied to other characteristics, such as transparency and texture mapping in the same manner. A depth error value generally represents an adjustment of the depth along an orthogonal scan line to account for a shift of the main slope in the orthogonal direction. Likewise, an intensity error value represents an adjustment of the intensity along an orthogonal scan line to account for the shift of the main slope. The error values are incorporated to adjust initial pixels along the main slope while the polygon is being interpolated, which correspondingly adjusts the entire orthogonal span line.

A graphics processor according to the present invention first loads the parameters into an interpolator, which provides the initial coordinates, width and characteristic values. Then, the processor draws consecutive pixels along the orthogonal span line for the entire initial width, where the incremental orthogonal intensity, depth and alpha blending values are added or subtracted for each adjacent pixel. Next, the y coordinate is incremented to the next orthogonal span line, the count value is decremented, the x coordinate is modified by an incremental amount along the main slope, the width is modified by the incremental width value, and each of the initial characteristic values of the base point are modified by corresponding incremental vertical characteristic values by the graphics processor. Also, the error values are either added or subtracted to adjust the depth and intensity characteristics to correspond to any change of the main slope. This identifies and determines the characteristics of the next initial pixel along the main slope for the next orthogonal span line. Again, the processor draws consecutive pixels along the new orthogonal span line for the entire adjusted width in a similar manner described above, where orthogonal intensity, depth and alpha blending values are added or subtracted for each adjacent pixel.

The interpolation method according to the present invention simplifies the logic and provides faster interpolation. Such improvements are vital to meet current market demands.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
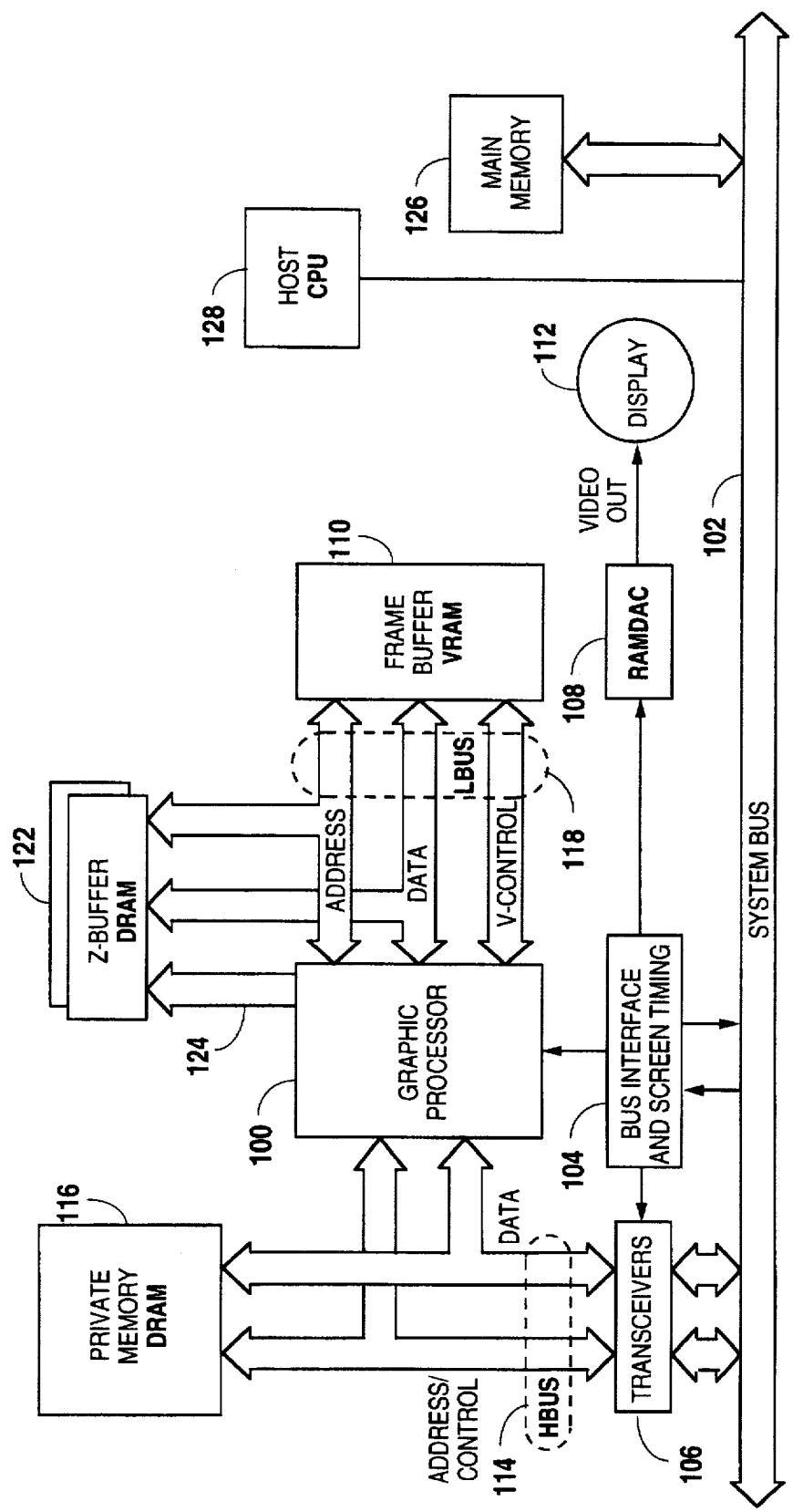
FIG. 1 is a simplified block diagram of a graphics system connected to a system bus of a computer system, where the graphics system includes a graphics processor according to the present invention.

Referring now to FIG. 1, a simplified block diagram is shown of a graphics system coupled to a system bus 102 of a host computer system, where the graphics system includes a graphics processor 100 implemented according to the present invention. The system bus 102 is any one of a plurality of different types of host or input/output (I/O) buses, including the industry standard architecture (ISA), the extended ISA (EISA), the peripheral component interconnect (PCI), the video electronic standard association (VESA) local bus or the L-bus, or any other standardized system bus of a computer system. The graphics processor 100 is preferably a 32-bit graphics processor operating at 33 MegaHertz (MHz) and is coupled to the system bus 102 through bus interface and screen timing logic 104. The bus interface and screen timing logic 104 is used to control a set of transceivers 106 and a random-access memory digital-to-analog converter (RAMDAC) 108, where it interfaces to the system bus 102, controls the decoding of cycles to the RAMDAC 108 and determines video timing.

The RAMDAC 108 receives digital data stored in a frame buffer 110 and converts the digital data to the appropriate analog outputs required by a display unit 112. In the preferred embodiment, the frame buffer 110 is part of a raster display implemented in a video RAM (VRAM), where the digital data comprises a rectangular array of picture elements referred to as pixels or pixel values. Each pixel is preferably 8 bits for defining the intensity of a single color of a corresponding pixel on a screen of the display unit 112. However, either three passes are made or three parallel logic slices are implemented for the three primary colors to achieve 24 bit pixel values for full color display. The display unit 112 may be any type, such as a cathode ray tube (CRT) for desktop, workstation or server applications, or a liquid crystal display (LCD) or the like commonly used for portable computers.

The transceivers 106 are used to interface the graphics processor 100 with the system bus 102 through address and data signals, collectively referred to as the HBUS 114, which is further connected to an optional private memory 116. In the preferred embodiment, the private memory 116 acts as a virtual frame buffer, display list storage, texture map, and bit mapped fonts storage memory to improve performance and functionality of the graphics system. The private memory 116 is preferably added as a separate bank of external dynamic RAMs (DRAMs) for providing a performance improvement by permitting faster access to display list instructions and pixel data compared to data stored in main memory 126 of the host computer system. The graphics processor 100 communicates to the frame buffer 110 through address data and control lines, collectively referred to as the LBUS 118, which is further connected to a Z-buffer 122, also preferably implemented using DRAMs. The Z-buffer 122 is preferably used to implement a depth buffer for three-dimensional (3D) graphic displays. Separate control signals 124 are also connected between the graphics processor 100 and the Z-buffer 122.

The host computer system preferably includes a central processing unit (CPU) 128 which is used to execute various software programs including a software driver which calculates and loads main and orthogonal slopes, start and stop values for pixel position, intensity, depth and transparency of objects to be rendered by the graphics processor 100. The software driver is preferably loaded into the main memory 126 from a permanent magnetic storage device, such as a hard drive or floppy drive device, and executed by the CPU 128, although other similar configurations are possible. The software driver will be described more fully below.

It is understood that the particular embodiment shown in FIG. 1 is only one of many possible implementations of a graphics system for use in a personal computer system. FIG. 1 is simplified for purposes of clarity so that many control signals are not shown. In the preferred embodiment, the graphics processor 100 provides hardware support for 2D and 3D graphics, text and windowing operations of a computer system. The graphics processor 100 transfers digital data between the main memory 126, the private memory 116, the frame buffer 110 and the Z-buffer 122, and processes the data for storage in the frame buffer 110 for ultimate display on the display device 112.

Figure 2:
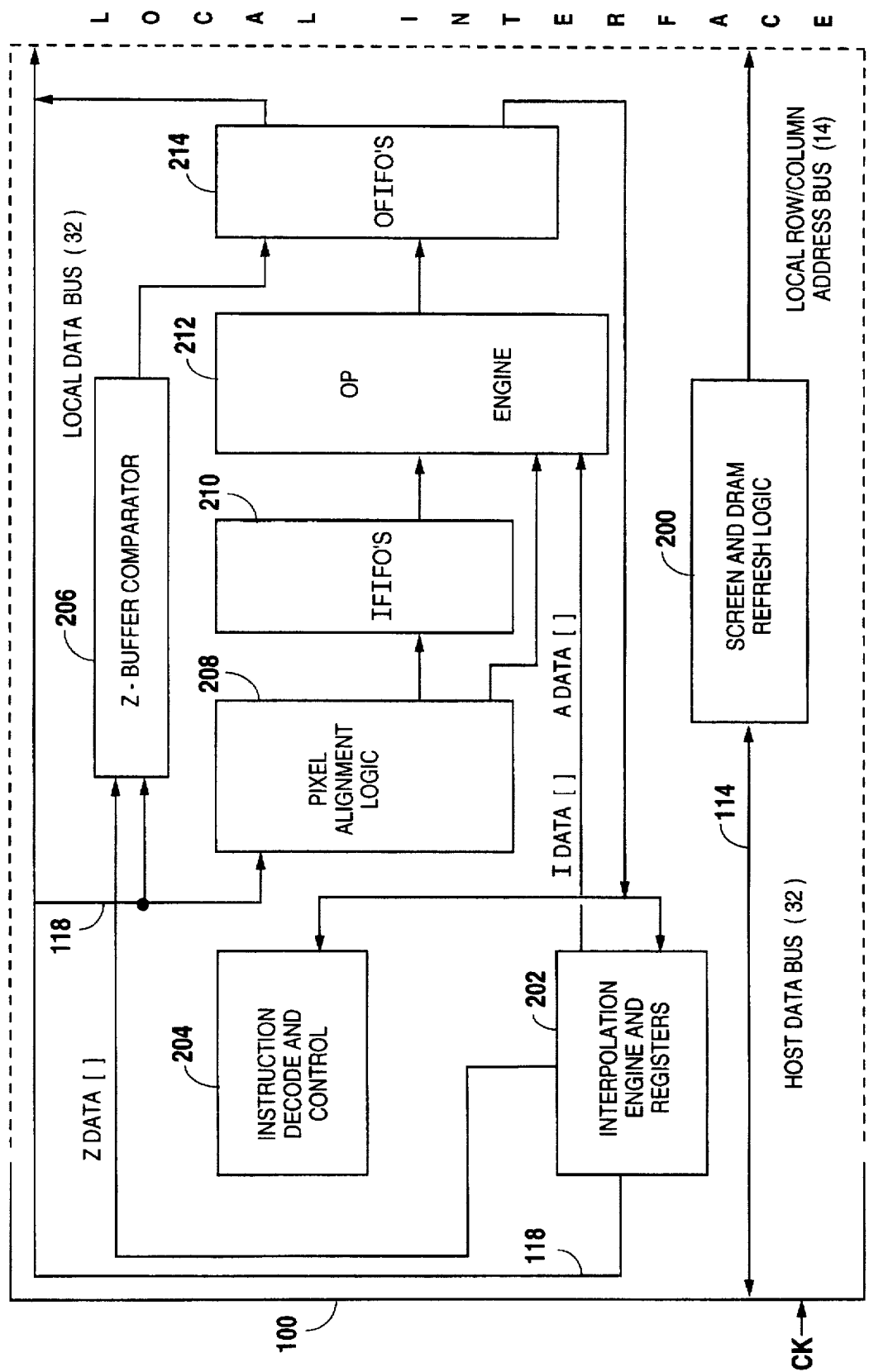
FIG. 2 is a simplified block diagram of the graphics processor of FIG. 1.
Figure 5:
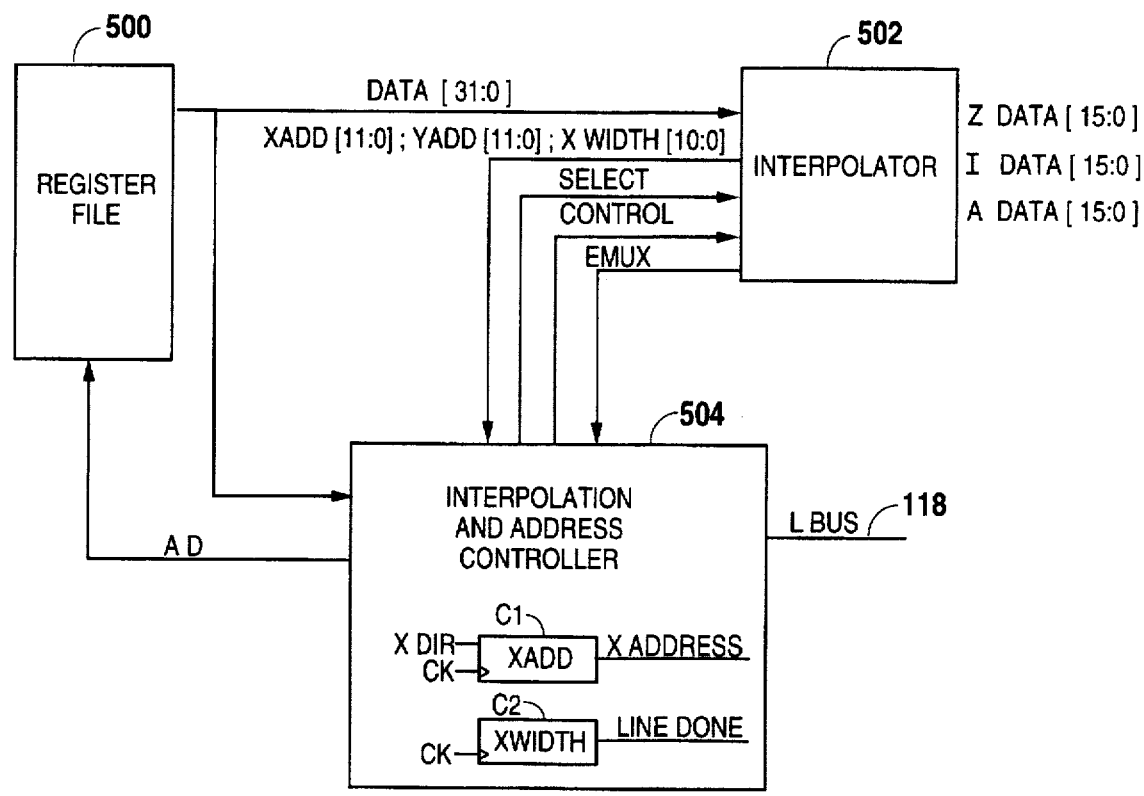
FIG. 5 is a simplified diagram of the polyengine of FIG. 2.

Referring now to FIG. 2, a simplified block diagram of the graphics processor 100 is shown. The HBUS 114 is connected to screen and refresh logic 200, an interpolation engine and associated registers (polyengine) 202, instruction decode and control logic 204, output first in, first out latches (OFIFOs) 214 and to pixel alignment logic 208. The HBUS 114 also preferably provides a 33 MHz clock signal CK, which synchronizes data flow and logic within the graphics processor 100. The screen and refresh logic 200 provides row and column address signals to the frame buffer 110 and to the Z-buffer 122. The pixel alignment logic 208 preferably includes registers and shift logic for the alignment of source and destination pixel addresses. The polyengine 202 preferably receives and stores vector data or parameters into a register file 500 (FIG. 5) for points, lines, polylines, polygons, and other geometric quantities, and then calculates or otherwise interpolates pixel position, color intensity, depth and transparency or alpha-blending for the various geometric quantities and characteristics. The register file 500 is preferably a set of 128 registers forming a read/write pre-storage and instruction queuing buffer for storing data and commands. The polyengine 202 determines address values for bit-block data transfer operations and provides color intensity values on an 8-bit bus having signals IDATA [7:0] and also provides alpha values on another 8-bit bus having signals ADATA[7:0] to an operation engine 212. The operation engine 212 generally performs alpha blending functions, color logic operations as well as compare and masking functions.

The LBUS 118 is provided to Z-buffer comparator logic 206 and also to pixel alignment logic 208. The Z-buffer comparator logic 206 is generally used for 3D operations for controlling the data to be displayed in overlap or transparency situations. Depth data values stored in the Z-buffer 122 are compared with depth values interpolated by the polyengine 202. As will be described more fully below, the polyengine 202 provides depth values on a 16-bit bus having signals ZDATA[15:0]. The pixel alignment logic 208 provides output pixel values to a set of input FIFOs (IFIFOs) 210 and also directly to the operation engine 212. These outputs are clocked through the IFIFOs 210 and output as pixel values which are provided to the operation engine 212. The IFIFOs 210 and the OFIFOs 214 are used to decouple the dynamic interface of the memories 110, 116, and 122. The IFIFOs 210 also synchronize source data for the opengine for read-modify-write (RMW) operations. The operation engine 212 provides output pixel values to the OFIFOs 214, which also provide pixel values from the Z-buffer comparator logic 206. The OFIFOs 214 provide pixel values from either the Z-buffer comparator logic 206 or from the operation engine 212, and provides these values to the LBUS 118 or to the HBUS 114.

In general, the graphics processor 100 operates in either a coprocessor or processor mode where the CPU 128 or the graphics processor 100, respectively, controls the system bus 102 for providing data and instructions to the register file 500 within the graphics processor 100 for execution. The polyengine 202 is designed to calculate pixel position, color intensity, depth and transparency or alpha-blending for the purpose of filling multiple-sided, coplanar randomly oriented polygon surfaces. Based upon the vertex points of the polygon to be rendered, the software driver calculates fundamental geometric parameters, including initial and incremental parameters for pixel position, count values, intensity, depth and transparency. These parameters and the corresponding instructions are then loaded into the register file 500, the polyengine 202 begins drawing orthogonal span lines in the frame buffer 110 to fill in the polygon. The interpolation process continues until the entire polygon has been filled in and drawn.

FIGS. 3A–3D illustrate several multi-sided polygons which can be drawn in a single command by the graphics processor 100 according to a preferred embodiment of the present invention. Such polygons include randomly oriented triangles, such as that shown in FIG. 3D, which do not have a "flat" bottom or a flat top. Although the graphics processor 100 can draw and shade many other types and shapes of polygons, such polygons may require more than one command. It is understood, however, that an error correction process according to the present invention may be applied to other graphic objects drawn in a pixel grid and is not limited to the particular implementation described herein.

Figure 3A:
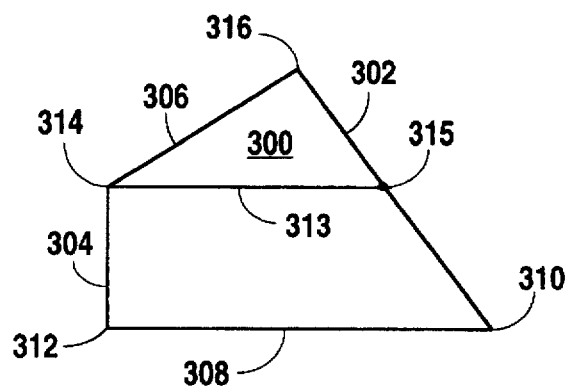
FIGS. 3A-3D are drawings of polygons which can be drawn and filled in a single command by the graphics processor of FIG. 1, according to the preferred embodiment.

To be able to draw any polygon with a single command in the preferred embodiment, certain constraints are followed. First, the polygon object preferably includes a single main slope, that is, one side that spans the entire vertical dimension of the polygon and that has no inflection points. In FIG. 3A, for example, a polygon 300 includes a main slope 302 spanning the entire vertical dimension of the polygon 300. The main slope 302 may have any orientation, but preferably has a vertical component in order to be non-trivial. Second, there are preferably no more than two opposite slopes per object. The opposite slopes can have any orientation as long as they lie completely on one side or the other of the main slope without crossing it and are within the vertical span of the main slope. In FIG. 3A, for example, the polygon 300 includes a first opposite slope 304 and a second opposite slope 306 relative to the main slope 302. Third, the polygon preferably includes up to three horizontal sides, including one at the bottom, one at the top, and one in-between the top and bottom where the opposite sides coincide in the vertical axis. A bottom side or base 308 of the polygon 300 shown in FIG. 3A has only a horizontal component and no vertical component and thus is considered a horizontal side rather than a slope. It is noted that three-sided polygons have no position or orientation restrictions whatsoever, so that any randomly oriented triangle is drawn with a single command. Fourth, the polygon is coplanar, meaning that the polygon lies in a single plane.

Figure 3B:
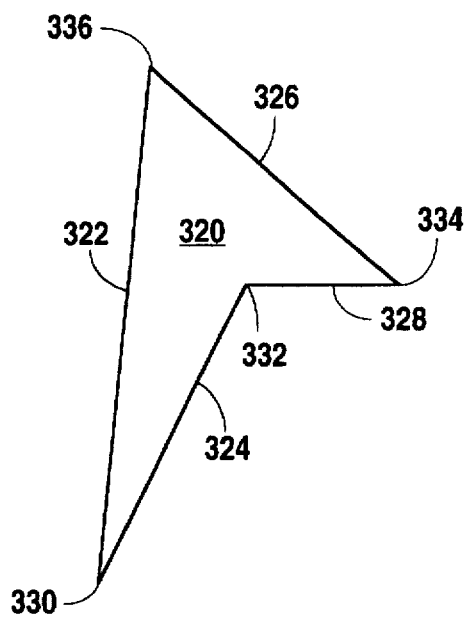
Figure 3C:
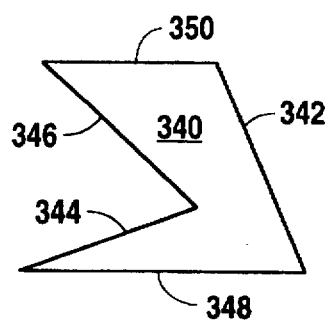
Figure 3D:
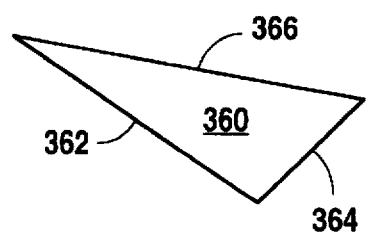

In FIG. 3B, a polygon 320 includes a main slope 322 extending the entire vertical extent of the polygon 320, a first opposite slope 324, a second opposite slope 326, and a horizontal side 328 intersecting the opposite slopes 324 and 326. In FIG. 3C, a five-sided polygon 340 is shown, including a main slope 342, two opposite slopes 344, 346 and two horizontal sides 348, 350 extending along the bottom and top, respectively, of the polygon 342. Also, a regular triangle 360 is shown in FIG. 3D, including a main slope 362 and two opposite slopes 364 and 366. Note that the polygons 300, 320, 340 and 360 may include depth values placing them in 3D space, but that polygons are mapped to a 2D grid for purposes of drawing them on the display 112. The depth values have no visual aspect other than for determining which objects or portion of objects are drawn since being in front of other objects. Furthermore, depth values identify intersecting points and lines of the polygon in 3D space.

FIGS. 3A–3D illustrate that the main slope is either on the right or left side of the polygon, as long as it expands the entire vertical dimension of the polygon. As will be described more fully below, the graphics processor 100 fills in or shades each polygon beginning at a base point at the lower vertice of the main slope and draws horizontal or orthogonal span lines, each beginning at the main slope and ending at an opposite slope. Although it is preferred that the polygons be drawn from bottom to top, the orthogonal span lines may also be dram from top to bottom. In FIG. 3A, the polygon 300 includes a base point 310 at the bottom vertice of the main slope 302, where the first orthogonal span line is drawn right to left from the base point 310 along the horizontal side 308 to a vertice 312 at the bottom end of the opposite slope 304. The next orthogonal span line is the next pixel row above the horizontal side 308 and is drawn between corresponding points along the main slope 302 and the opposite slope 304. This process continues until an orthogonal line 313 is drawn to a midpoint 314 from a corresponding point 315 on the main slope 302. Then, orthogonal span lines are drawn from the main slope 302 to the opposite slope 306. The procedure is completed when the last orthogonal span line (or point) is drawn at the upper vertice of 314 of the main slope 302.

Likewise in FIG. 3B, the polygon 320 includes a base point 330 at the lower vertice of the main slope 322. The orthogonal span lines are drawn left to right from the main slope 322 towards the opposite slope 324 until reaching a mid-point 332, at which point the procedure continues where orthogonal span lines are drawn from the main slope 322 towards the opposite slope 326 from a midpoint 334 to an endpoint 336 at the intersection of the opposite slope 326 and the main slope 322. The procedure is very similar for the polygons 340 and 360.

Figure 4:
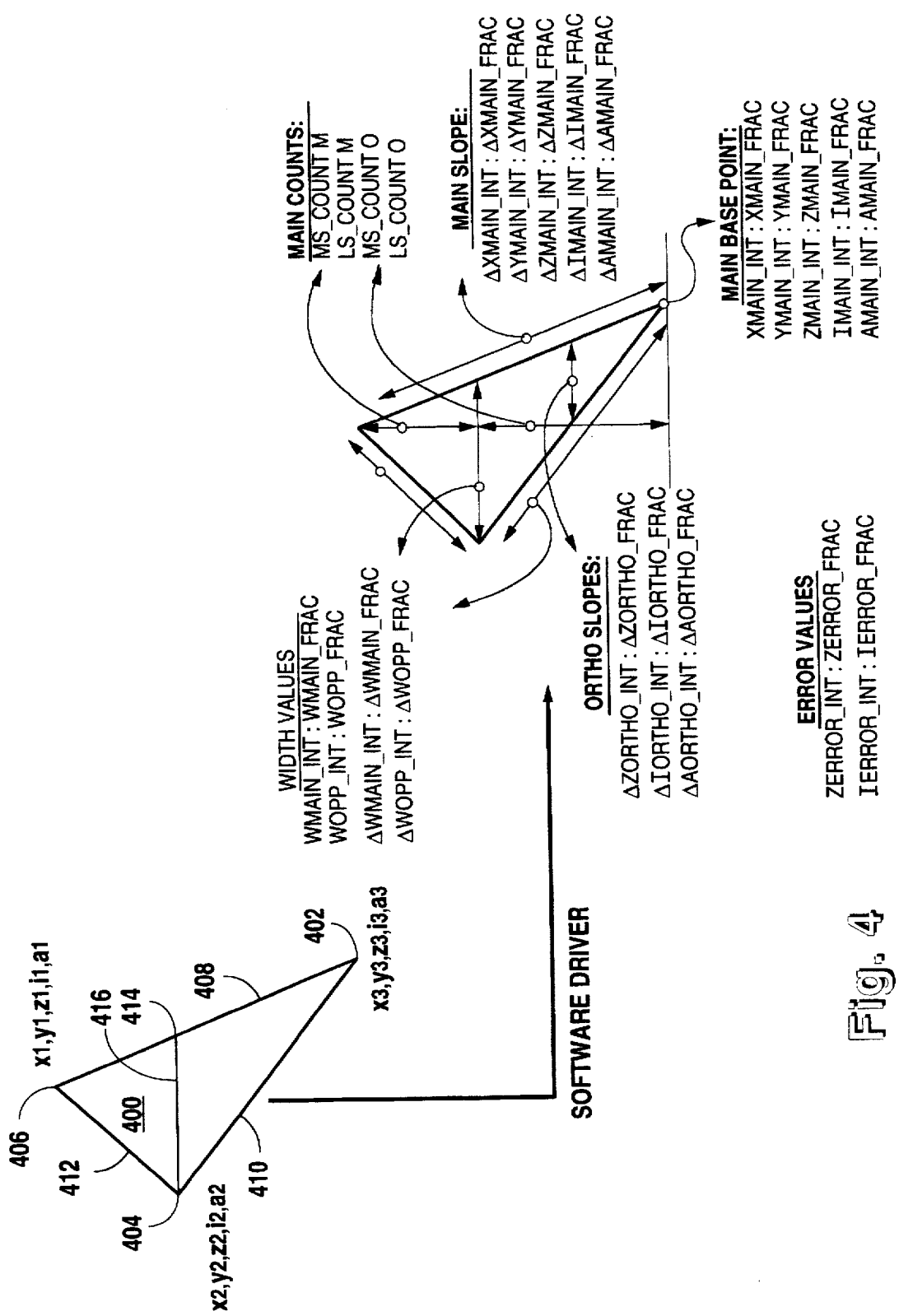
FIG. 4 is a diagram illustrating calculations performed by a software driver for parameterization of a particular triangle.

Referring now to FIG. 4, a diagram is shown illustrating the calculations performed by the software driver executed by the CPU 128 to derive the fractional components for a 3D shaded and alpha-blended triangle 400. It is understood that although more complicated polygons may also be drawn, such as those shown in FIGS. 3A–3C, the triangle 400 will be used to demonstrate the present invention. The triangle 400 is defined by three vertices, including a base point 402, a midpoint 404 and a top or endpoint 406. Therefore, a main slope 408 is defined between the base point 402 and the endpoint 406, and two opposite slopes 410 and 412 are defined between the base point 402 and the midpoint 404, and between the midpoint 404 and the endpoint 406, respectively. The base point 402 is located in the two-dimensional pixel grid having an orthogonal component x3, a vertical component y3, and a depth value z3. The x and y coordinates correspond to a pixel value in the pixel grid within the frame buffer 110, whereas the z depth value is contained within the Z-buffer 122. The base point 402 has an intensity value of i3 and an alpha-blending value of a3. Likewise, the midpoint 404 is defined with parameters x2, y2, z2, i2, and a2 and the endpoint 406 is defined with corresponding parameters x1, y1, z1, i1, a1. It is noted that the depth values preferably vary linearly while traversing the vertical direction of the triangle 400, generally from z3 to z1, and also in the orthogonal direction, generally from z3 to z2. Likewise, the intensity and alpha values vary linearly in the vertical direction from i3 and a3 to i1 and a1, respectively, and in the orthogonal direction from i3 and a3 to i2 and a2, respectively. These values may either increase or decrease.

The software driver receives the parameters x1, x2, x3, y1, y2, y3, z1, z2, z3, i1, i2, i3, a1, a2, a3 and converts these parameters into values defining the base point 402, the main slope 408, and into slope or incremental values defining incremental changes in the width, depth, intensity and alpha parameters relative to the base point 402 and the main slope 408. It is noted that for efficiency and because of the implementation of the VRAMs comprising the frame buffer 110 or the DRAMs comprising the Z-buffer 122, each of the polygons are drawn using orthogonal span lines. A row address is first provided to precharge the RAMs (including VRAMs and DRAMs), where the time for precharging is typically on the order of approximately 80 nanoseconds (ns). Then column addresses are provided to access individual RAMs defining each pixel in the orthogonal row or scan line. In this manner, after the row of RAMs are precharged, column addresses are completed after only approximately 20 ns per pixel. The base point identifies the initial pixel value to be drawn, and the main slope identifies each subsequent initial pixel to be drawn for each consecutive orthogonal span line, where the y coordinate or parameter is preferably incremented by one to address the next orthogonal span line. The width parameter identifies the number of pixels to be drawn per span line and an x direction bit identifies the direction of the span lines. Since each polygon is preferably drawn using orthogonal scan lines as described above, the slope or incremental values calculated by the software driver are determined for the orthogonal and vertical directions.

The software driver is preferably written in the C language, preferably uses floating point or double precision arithmetic to achieve the desired accuracy and provides integer and fractional values for each calculated parameter. The parameters x3, y3, z3, i3 and a3 of the base point 402 are converted directly to integer and fractional values. In particular, the x3 parameter is converted to an integer portion XMAIN_INT and a fractional value XMAIN_FRAC. Likewise, the y3, z3, i3 and a3 parameters are converted to integer and fractional values YMAIN_INT, YMAIN_FRAC, ZMAIN_INT, ZMAIN_FRAC, IMAIN_INT, IMAIN_FRAC, and AMAIN_INT, and AMAIN_FRAC, respectively. The x and y values XMAIN_INT and YMAIN_INT preferably have an integer resolution of 12 bits to address 4,096 pixels, and the fractional values XMAIN_FRAC and YMAIN_FRAC have a pixel resolution of 12 bits to divide each pixel by 4,096. This allows a maximum accumulated error of less than a pixel across a 4096 by 4096 pixel display. The ZMAIN_FRAC and IMAIN_FRAC fractional values also have 12 bits each. The ZMAIN_INT value, however, has 16 bits for a resolution of 65,536 "pixels" for the depth value. The IMAIN_INT or integer portion of the color intensity is preferably 8 bits wide to achieve 256 intensity values for each color. In the preferred embodiment, each of the primary colors red, green and blue have 8-bit intensity values. Finally, the alpha values AMAIN_INT and AMAIN_FRAC are each preferably 8 bits. The software driver preferably uses floating point arithmetic or double precision for the parameters of the other vertices 404 and 406, although these parameters are only used indirectly to calculate incremental values, described further below, and thus are not loaded into the register file 500.

The vertical span of the polygon 400 is calculated as the difference between the y values at the vertices 406 and 402 or the difference between y1 and y3. However, the vertical span is preferably separated into two parts, including a main count value corresponding to the number of vertical pixels in the first opposite slope 410, and an opposite count value corresponding to the number of vertical pixels in the second opposite slope 412. Thus, the main count value is the vertical span between the y parameter of the midpoint 404 and the base point 402, or y2–y3. Only the integer portion of the main count is used and the resulting value is separated into a most significant byte called MS_COUNTM and a least significant byte called LS_COUNTM. These values together, MS_COUNTM:LS_COUNTM, represent the number of orthogonal span lines between the base point 402 and the midpoint 404. Likewise, opposite count values are achieved by subtracting y2–y1 to obtain a most significant opposite count byte MS_COUNTO and a least significant byte LS_COUNTO, where these two values together, MS_COUNTO:LS_COUNTO, represent the number of orthogonal span lines between the midpoint 404 and the endpoint 406. Again, only the integer portion is needed for the opposite count. In this manner, MS_COUNTM:LS_COUNTM orthogonal span lines are drawn from the base point 402 to the midpoint 404, and MS_COUNTO:LS_COUNTO orthogonal span lines are drawn from the midpoint 404 to the endpoint 406.

The software driver also calculates initial and incremental width values for both the lower or main portion of the triangle 400 between the midpoint 404 and the base point 402, as well as for the opposite or top portion between the endpoint 406 and the midpoint 404. In this manner, the graphics processor 100 uses an initial width value and an incremental width value in order to determine the length of each of the orthogonal span lines to be drawn. The width at the main base point is calculated and converted to integer and fractional values WMAIN_INT and WMAIN_FRAC, where each of these values has a resolution of 12 bits corresponding to the resolution of the x parameters. However, since the base point 402 of the triangle 400 has no width, these values are preferably zero. It is noted, however, that a value other than zero may arbitrarily be loaded into these values in the event the slope of the first opposite slope 410 is very small, near zero. For example, the initial width values of the polygon 300 shown in FIG. 3A are not zero and would be the orthogonal distance between the points 310 and 312.

An incremental value or slope of the width of the triangle 400 is calculated as values ΔWMAIN_INT and ΔWMAIN_FRAC. Since the initial width is zero, these incremental values define the length of an orthogonal line 416 corresponding to the midpoint 404, divided by the change in y from the base point 402 to the midpoint 404, which is y2–y3. Thus, the initial width WMAIN_INT:WMAIN_FRAC is incremented by ΔWMAIN_INT:ΔWMAIN_FRAC for each orthogonal span line. It is noted that variables denoting incremental or slope values are preceded by a delta (Δ) symbol and typically have the same number of bits as their corresponding initial values, although the slope values also typically include a sign bit indicating the direction of change. Concerning the width values, note that although fractional values are used in the calculations for accuracy, only the integer portion is used to determine the actual number of pixels drawn. Also, the software driver determines an x direction bit for defining the direction each span line is written into the frame buffer 110 and/or the Z-buffer 122. For the triangle 360, span lines are written from the main slope 362 at the left towards the opposite slopes 364, 366 for a positive x direction for the polygon 340, however, span lines are written in the opposite or negative x direction.

Interpolation proceeds from the base point 402 to the midpoint 404 to draw the main or lower portion of the triangle 400. When this is completed, the initial width value is replaced by the maximum orthogonal width of the triangle 400 corresponding to the midpoint 404, which is a value WOPP_INT:WOPP_FRAC. This width value is the length of the line 416. Finally an incremental opposite width value ΔWOPP_INT:ΔWOPP_FRAC is the incremental change in the width from one orthogonal span line to the next between the midpoint 404 and endpoint 406. This incremental width value for the opposite slope is calculated in a similar manner as the incremental width values for the main portion.

The software driver also calculates the main slope values, which are the incremental changes in the x, y, z, i, and a parameters corresponding to the changes in the location, depth, color intensity and alpha values along the main slope 408. The x slope is defined as ΔXMAIN_INT:ΔXMAIN_FRAC, which is calculated using the equation $(x1-x3)/(y1-y3)$. Note that this will be a negative value for the triangle 400 since x is decreasing. Since the vertical component y is the main stepping value for each orthogonal span line, the incremental y value ΔYMAIN_INT:ΔYMAIN_FRAC is chosen to be a value of 1, where the YMAIN_INT:YMAIN_FRAC value is incremented by 1 to address the next orthogonal span line. This value could be a negative one (−1) to draw the triangle 400 from top to bottom. The z slope is defined as ΔZMAIN_INT:ΔZMAIN_FRAC and is calculated in a similar manner as the x value using the equation $(z1-z3)/(y1-y3)$. This is the incremental change of the depth parameter along the main slope 408 for the initial pixel of each orthogonal span line. The incremental changes of the color and alpha values, or ΔIMAIN_INT:ΔIMAIN_FRAC and ΔAMAIN_INT:ΔAMAIN_FRAC are calculated in a similar manner, using the equations $(i1-i3)/(y1-y3)$ and $(a1-a3)/(y1-y3)$, respectively.

The software driver also calculates incremental orthogonal values or the changes in the depth, color, and alpha-blending in the orthogonal direction of the triangle 400. These values are ΔZORTHO_INT:ΔZORTHO_FRAC, ΔIORTHO_INT:ΔIORTHO_FRAC and ΔAORTHO_INT:ΔAORTHO_FRAC, respectively. Note that the x parameter is handled with the width values so that no further calculation is necessary. The calculation of the orthogonal slopes are slightly more complicated, but can be determined in any manner consistent with geometric principles. One method is to divide the difference of the z, i and a values between points 414 and 404 by the length of the orthogonal line 416. Of course, the x, z, i and a parameters at the point 414 would have to be derived first. These parameters are derived easily from the parameters of the base point 402 and the endpoint 406 since all of the parameters vary linearly along the main slope 408.

The software driver also determines an error value for the depth parameter including a 16-bit integer ZERROR_INT and a 12-bit fractional portion ZERROR_FRAC. Furthermore, a color intensity error value has an 8 bit integer portion IERROR_INT and a 12 bit fractional portion IERROR_FRAC. These error values are calculated by the software driver and loaded into the register file 500 if error correction is desired. If 0's are loaded into these registers indicating that error correction is not desired, a separate zero detector circuit (not shown) turns off error correction. The depth error value is the orthogonal slope or incremental change of the z parameter in the orthogonal direction multiplied by the fractional portion of the incremental change of the x parameter along the main slope. Likewise, the intensity error value is the orthogonal slope or incremental change of the i parameter in the orthogonal direction multiplied by the fractional portion of the incremental change of the x parameter along the main slope. If the main slope is vertical or diagonal, error correction would not be needed. Thus, the error values take into account the fractional portion of the slant of the main slope in the orthogonal direction. It is noted that the integer portion of the x slope is not used since the error values primarily concern the fractional offsets within the pixels.

For purposes of full disclosure, the calculations performed in the actual code of the software driver will be described briefly for the z orthogonal slope and depth error values. It is understood that the orthogonal slope and error values for intensity are derived in a very similar manner. Also, if error correction is desired for other characteristics such as transparency and texture mapping, the calculations are similar. The span of the x, y and z values along the main slope 408 of the triangle 400 are defined as dx, dy and dz and are calculated as $dx=x1-x3$, $dy=y1-y3$ and $dz=z1-z3$, respectively. Likewise, the span of the x, y and z values along the first opposite slope 410 are defined as dx1, dy1 and dz1 and are calculated as $dx1=x2-x1$, $dy1=y2-y1$ and $dz1=z2-z1$, respectively. Corresponding slopes of the x and z values along the main slope 408 are calculated as xslope=dx/dy and zslope=dz/dy. Also, the slopes of the x and z values along the opposite slope 410 are x1slope=dx1/dy1 and z1slope=dz1/dy1. Orthogonal values of the x values are calculated using the following equations:

$$x\_ortho\_main = x3 + (xslope * dy1 * dy);$$

$$x\_ortho\_end = x3 + (x1slope * dy * dy1);$$

$$dx\_ortho = x\_ortho\_end - x\_ortho\_main;$$

where the asterisk (*) symbol denotes multiplication. A directional value "dir" is equal to 1 if the dx_ortho value is greater than zero, but is −1 otherwise. Orthogonal spans and slopes of the z value are calculated using the following equations:

$$z\_ortho\_main = z3 + (zslope * dy1 * dy);$$

$$z\_ortho\_end = z3 + (z1slope * dy * dy1);$$

$$dz\_ortho = z\_ortho\_end - z\_ortho\_main;$$

$$z\_ortho\_slope = dir * (dz\_ortho/dx\_ortho).$$

Finally, the z or depth error value is then calculated using the following equation:

$$z\_error = \_dir * z\_ortho\_slope * modf(xslope, \&dummy);$$

where the modf function returns the fractional portion of the xslope and places the integer portion in a variable pointed by dummy, which is preceded by a pointer symbol (δ). As indicated above, the i or intensity error value is determined in a similar manner. A copy of the source code of the software driver for calculating the parameters is included as Appendix A of this disclosure. The actual code is generalized to handle other types of objects and polygons, so that detailed discussion is beyond the scope of this disclosure.

The following Table I is a copy of the register file 500 for containing the fundamental components calculated by the software driver for drawing objects including polygons:

registers R2 and R4 are sign bits of the incremental slope values for the y and x components, respectively. The sign bits are used as directional values for determining the direction of the main slope in the vertical and horizontal directions. In particular, the y direction is typically positive to draw the polygon from bottom to top, but can also be drawn from top to bottom, where the y value would be negative. Likewise, the x value is negative if the x value decreases along the main slope 408, but is otherwise positive. Sign bits are also provided in registers R4, R6, R8, R10, and R12–18, as shown in Table I indicating the directions of each of the corresponding values adjacent the sign bits. In the preferred embodiment, the software driver represents negative numbers in 2's compliment form for simplification of adders and subtractors in the interpolator portions. The sign bits are extended to fill the designated register if no other variables are included, so that the most significant bit (msb) of the register indicates the sign of the number.

TABLE I

Contents of Register File 500

| 31 — 28 | 27 — 24 | 23 — 20 | 19 — 12 | 11 — 0 | N | A |
|---|---|---|---|---|---|---|
| MS_COUNTM | | YMAIN_INT | | YMAIN_FRAC | R1 | 28h |
| LS_COUNTM | | ΔYMAIN_INT | | ΔYMAIN_FRAC | R2 | 29h |
| x y | | XMAIN_INT | | XMAIN_FRAC | R3 | 2Ah |
| | | ΔXMAIN_INT | | ΔXMAIN_FRAC | R4 | 2Bh |
| | | ZMAIN_INT | | ZMAIN_FRAC | R5 | 2Ch |
| | | ΔZMAIN_INT | | ΔZMAIN_FRAC | R6 | 2Dh |
| | | IMAIN_INT | | IMAIN_FRAC | R7 | 2Eh |
| | | ΔIMAIN_INT | | ΔIMAIN_FRAC | R8 | 2Fh |
| | | WMAIN_INT | | WMAIN_FRAC | R9 | 30h |
| | | ΔWMAIN_INT | | ΔWMAIN_FRAC | R10 | 31h |
| MS_COUNTO | | WOPP_INT | | WOPP_FRAC | R11 | 32h |
| LS_COUNTO | | ΔWOPP_INT | | ΔWOPP_FRAC | R12 | 33h |
| | ZERROR_INT | | | ZERROR_FRAC | R13 | 34h |
| | ΔZORTHO_INT | | | ΔZORTHO_FRAC | R14 | 35h |
| | | IERROR_INT | | IERROR_FRAC | R15 | 36h |
| | | ΔIORTHO_INT | | ΔIORTHO_FRAC | R16 | 37h |
| | | | ΔAORTHO_INT | ΔAORTHO_FRAC | R17 | 38h |
| AMAIN_INT | AMAIN_FRAC | | ΔAMAIN_INT | ΔAMAIN_FRAC | R18 | 39h |

16  15        8  7

N = Register Name
A = Register Address

As shown in Table I there are preferably eighteen separate registers R1–R18, each thirty-two bits in width for containing the parameters for the base point, main and opposite counts, main slope, initial and incremented width values, orthogonal incremental values and the error values as described above. The corresponding bit locations of the parameters are located at the top and bottom of the Table I. Bit 31 of the register R3 is the x direction bit defining the direction that each orthogonal span line is drawn. Bit 23 of Referring now to FIG. 5, a simplified block diagram is shown of the polyengine 202. The register file 500 is connected to an interpolator 502 through a DATA bus having signals DATA[31:0]. The register file 500 receives addresses on an address bus AD from an interpolation and address controller 504, which also receives the DATA[31:0] signals. The controller 504 asserts addresses on the AD bus corresponding to the register addresses listed in Table I to access the corresponding registers, and the contents of the addressed register is asserted on the DATA[31:0] signals. The controller 504 also asserts corresponding select signals to the interpolator 502 for accessing and loading corresponding registers in the interpolator 502, which receives the data from the DATA bus. The select signals are XMSEL, DXMSEL, YMSEL, DYMSEL, ZMSEL, DZMSEL, IMSEL, DIMSEL, WMSEL, DWMSEL, WOSEL, DWOSEL, ZESEL, DZOSEL, IESEL, DIOSEL, AMSEL, DAMSEL and DAOSEL, which will be described more fully below. The controller 504 asserts various control signals to the interpolator 502, including signals MLOAD, THALF, EINIT, OINIT and ERRLOAD, which also will be described more fully below. The controller 504 also includes internal registers C3, C4 for loading the MS_COUNTM:LS_COUNTM and MS_COUNTO:LS_COUNTO count values and the x direction bit from the register file 500.

The interpolator 502 provides x,y address values to the controller 504 on signals XADD[11:0] and YADD[11:0], respectively, and also provides w width values on signals XWIDTH[10:0]. The controller 504 uses these values to determine the appropriate address to assert on the LBUS 118 to access pixel values in the frame buffer 110. In general, the XADD[11:0] and YADD[11:0] signals indicate the address of the initial pixel to be drawn for each orthogonal scan line, the XWIDTH[10:0] signals indicate the corresponding width of the orthogonal scan line and the x direction bit determines the direction each scan line is drawn. Thus, the controller 504 asserts an address on the LBUS 118 corresponding to the YADD[11:0] signals to precharge that row, and then increments or decrements the XADD[11:0] signals, depending upon the x direction bit, to address individual pixels in that row, one at a time, until the current orthogonal scan line is completed.

In general, XADD[11:0] defines the first pixel, XWIDTH [10:0] is used as a count to determine how many pixels to draw and the x direction bit determines the direction. More particularly, the YADD[11:0] signals are used directly to provide the y address for the pixels. The XADD[11:0] signals are loaded into a counter C1 which also receives the x direction bit, and then counts up or down depending upon the x direction bit. Preferably, if the x direction bit is 0 the counter C1 counts up, but otherwise counts down (negatively if the x direction bit is 1). Pulses provided on clock signal CK control the count. Thus, the counter C1 outputs the x address for the pixels with each pulse of the CK signal. The XWIDTH[10:0] signals are loaded into another counter C2, which is preferably a down-counter and which also receives the CK signal. With each pulse of the CK signal, the counter C2 decrements until reaching 0, at which time it reaches terminal count and asserts a line done signal or bit indicating that the line is completed. The controller 504 also loads the count values from the registers R1, R2, R11 and R12 into separate registers (not shown) to determine how many orthogonal scan lines to draw. The YADD [11:0] signal is incremented by the interpolator 502 to address the next scan line. The controller 504 then decrements the counter C3 loaded with the main count value MS_COUNTM:LS_COUNTM and draws the next scan line, and this process repeats until the first or lower half of the polygon is completed. Then, the MS_COUNTO:LS_COUNTO count values are decremented using the counter C4 and the process is continued in the same manner until the top half of the polygon is drawn.

FIGS. 6A–6H are schematic diagrams showing various portions of the interpolator 502 of the polyengine 202. As described above, the DATA[31:0] signals are provided to load data from the register file 500 into various corresponding registers in the interpolator 502. Thus, once the register file 500 is loaded and an instruction is received for drawing a polygon, the controller 504 loads the registers in the interpolator 502 with the data from the register file 500 through the DATA[31:0] signals. In this manner, the register file 500 is preferably loaded with new values while the present object is being interpolated and drawn. As will be described more fully below, many of the registers are connected to only portions of the DATA[31:0] signals depending upon the resolution of the data. The particular sizes of registers, adders, multiplexers in the Figures are determined for speed, efficiency, and resolution of the parameters, and are not intended to limit the present invention. The sizes of the actual registers are typically 2 bits or more longer than the associated parameters to prevent overflow should an object extend off the screen or out of bounds. In this manner, the logic associated for determining intensity and depth values prevents wrapping so that out of bounds parameters do not wrap back onto the screen.

Figure 6A:
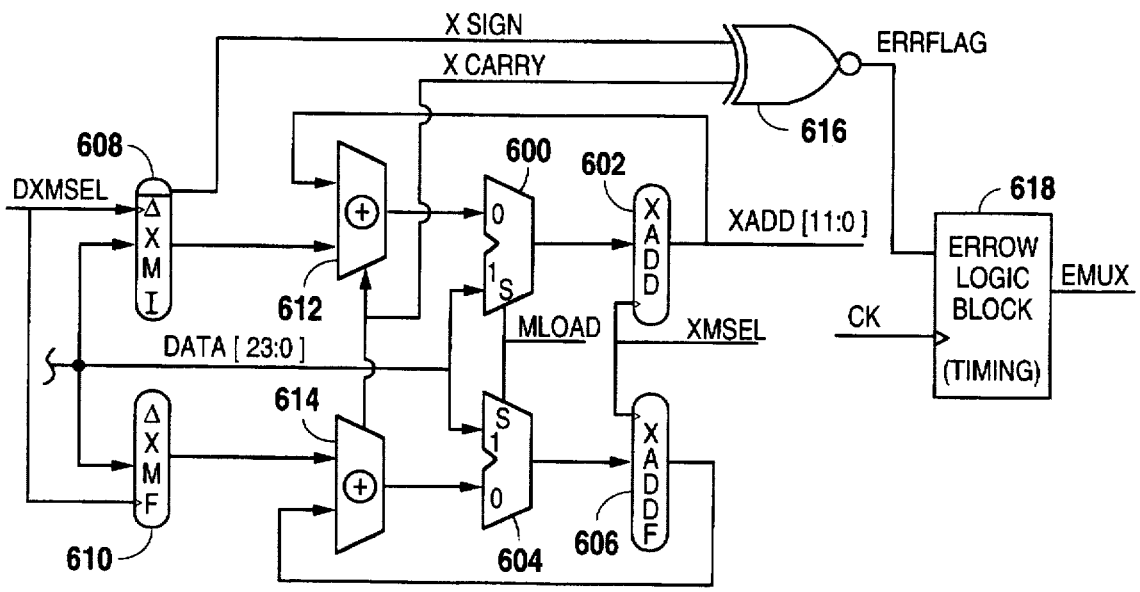
FIGS. 6A–6H are schematic diagrams illustrating various interpolators within the interpolator engine of FIG. 2.

Referring now to FIG. 6A, a schematic diagram of the interpolator for the x parameter is shown. When drawing and filling polygons according to the present invention, this portion of the interpolator provides the x address of the initial pixel along the main slope of the polygon. A two-input 12-bit multiplexer (MUX) 600 receives the DATA[23:12] signals at one input and another two-input 12-bit MUX 604 receives the DATA[11:0] signals at one of its inputs. A signal MLOAD is provided to the select input terminal of the MUXs 600 and 604. The output of the MUX 600 is connected to the input of a 12-bit register XADD 602 for storing the XMAIN_INT value, and the output of the MUX 604 is connected to the input of another 12-bit register XADDF 606, for storing the XMAIN_FRAC value. A signal XMSEL is provided to the clock inputs of both registers XADD 602 and XADDF 606. Similarly, the DATA [23:12] signals are provided to the input of a 12-bit register AXMI 608 for receiving the AXMAIN_INT value, and the DATA[11:0] signals are provided to the input of another 12-bit register AXMF 610 for receiving the AXMAIN_FRAC value. A signal DXMSEL is provided to the clock inputs of both the AXMI 608 and AXMF 610 registers.

The output of the AXMF register 610 is connected to one input of a 12-bit adder 614, which has its other input connected to the output of the XADDF register 606. The output of the adder 614 is provided to the other input of the MUX 604. The adder 614 provides an overflow output signal referred to as XCARRY. The XCARRY signal is provided to the CARRY (GIN) input of a 12 bit adder 612, which has one input connected to the output of the AXMI register 608 and its other input connected to the output of the XADD register 602. The XCARRY signal is used to indicate when the fractional portion of the orthogonal component citrics to the next column of the pixel array in the frame buffer 110, as will be described more fully below. The output of the adder 612 is provided to the other input of the MUX 600. The upper bit of the AXMI register 608 is a signal XSIGN indicating the sign of the x slope parameter. The output of the XADD register 602 provides signals XADD [11:0], which are used as the x address or coordinate of the orthogonal component of the pixel array in the frame buffer 110. The XSIGN and XCARRY signals are provided to the inputs of a two-input exclusive-OR (XOR) gate 616, which provides a signal ERRORFLAG at its output. The ERRFLAG signal is provided to an error logic block 618, which receives a CLK clock signal and provides a signal EMUX at its output. The CLK signal is related to and synchronized with the CK signal. The error logic block 618 asserts the EMUX signal after the ERRFLAG signal is asserted, but synchronized with the CK signal and with other interpolators described below. Thus, the error logic block 618 is for timing and synchronization purposes. The EMUX signal will be described more fully below.

The XMAIN_INT and XMAIN_FRAC values from register R3 of the register file 500 are asserted on the DATA[23:0] signals and loaded into the XADD 602 and XADDF 608 registers, respectively, while the MLOAD signal is asserted and the XMSEL and DXMSEL signals are clocked. Likewise, the ΔXMAIN_INT and ΔXMAIN_FRAC values from register R4 are asserted on the DATA [23:0] signals and loaded into the ΔXMI 608 and ΔXMF 610 registers, respectively, while the MLOAD signal is asserted and DXMSEL signal is clocked. Once these registers are loaded and the MLOAD signal is negated, the XMSEL and DXMSEL signals are used to interpolate the x value to provide the x address or coordinate of each initial pixel along the main slope. Thus, the XMSEL and DXMSEL signals are asserted after an orthogonal span line is completed to begin the next orthogonal span line. Each time the DXMSEL signal is asserted, the contents of the ΔXMF register 610 is added to the contents of the XADDF register 606, and the sum is clocked back into the XADDF register 606. The XCARRY signal indicates when the fractional value overflows to the integer value, which causes the orthogonal span line to carry over another column of pixels. Each time the XMSEL signal is asserted, the contents of the ΔXMI register 608 and the XCARRY signal are added to the contents of the XADD register 602, and the sum is clocked back into the XADD register 602. Only the integer portion, asserted on the XADD[11:0] signals, is used to determine the x coordinate of the pixel. Since the values being added by the adders 612 and 614 are represented in 2's complement form, the XOR gate 616 determines when an overflow of the adder 614 occurs. If the sign of the ΔXMAIN_INT is positive so that the XSIGN signal is 0, an overflow occurs when the XCARRY signal is 1. Otherwise, an overflow occurs when the XCARRY signal is 0.

Figure 6B:
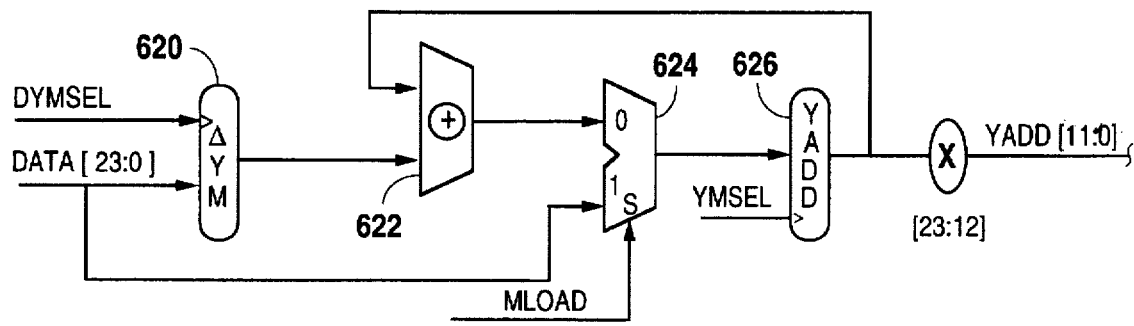

Referring now to FIG. 6B, a schematic diagram of the interpolator for the y parameter is shown. When drawing and filling polygons according to the present invention, this portion of the interpolator provides the y address of the initial pixel along the main slope of the polygon. When drawing and filling polygons in a single command, the incremental value ΔYMAIN_INT is set to one and ΔYMAIN_FRAC is set to zero. Thus, the y parameter points to the next orthogonal span line to be drawn in the pixel array. Of course, the incremental value could be set to −1 to draw in the opposite direction, the present invention not being limited to any particular direction. A two-input, 24-bit MUX 624 receives the DATA[23:0] signals at one data input and has its other data input connected to the output of a 24-bit adder 622. It is noted that the integer and fractional portions are combined in a single register rather than being divided into two registers, as was done for the x parameter. A 24-bit register ΔYM 620 receives the DATA [23:0] signals at its input and has its output connected to one input of the adder 622. The clock input of the ΔYM register 620 receives a signal DYMSEL. The other input of the adder 622 is connected to the output of a 24-bit register YADD 626, where the input of the YADD register 626 is connected to the output of the MUX 624 and receives a signal YMSEL at its clock input. The signal MLOAD is connected to the select input of the MUX 624.

The YMAIN_INT and YMA1N_FRAC values from register R1 are asserted on the DATA[23:0] signals and loaded into the YADD register 626 while the MLOAD signal is asserted and when the YMSEL signal is clocked. Likewise, the ΔYMAIN_INT and ΔYMAIN_FRAC values from register R2 are asserted on the DATA[23:0] signals and loaded into the ΔYM register 620 while the MLOAD signal is asserted and when the DYMSEL signal is clocked. A tap 628 receives the integer portion or upper 12 bits [23:12] of the YADD register 626 and provides the YADD[11:0] signals at its output, which determine the y coordinate for each pixel to be drawn.

Once these registers are loaded and the MLOAD signal is negated, the YMSEL signals is clocked to interpolate or increment the y parameter to provide the y address or coordinate of each initial pixel along the main slope, which is also the same y coordinate of each pixel in that orthogonal span line. In this manner, the RAM memory remains in a row precharge state during the entire span line for better speed and efficiency. Each time the YMSEL signal is asserted, the contents of the YADD register 626 is added to the contents of the ΔYM register 620, and the sum is loaded back into the YADD register 626.

Figure 6C:
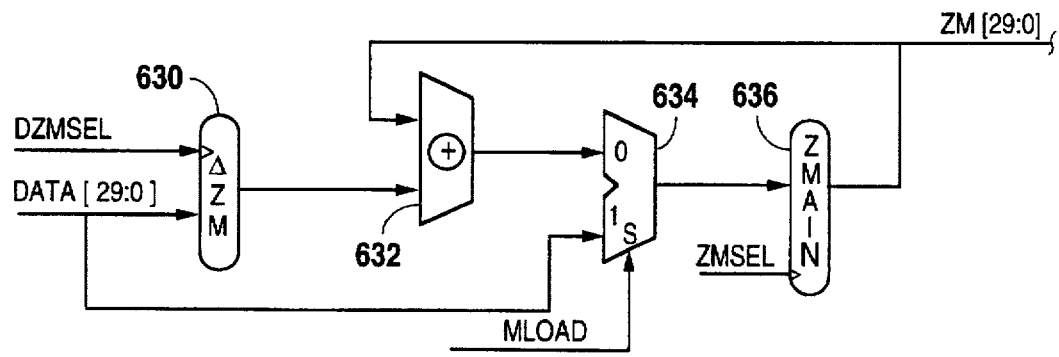

Referring now to FIG. 6C, a schematic diagram of the main slope interpolator for the depth or z parameter is shown. When drawing and filling polygons according to the present invention, this portion of the interpolator provides the depth value of each initial pixel along the main slope of the polygon being drawn, where the depth values are stored in the Z-buffer 122. A two-input, 30-bit MUX 634 receives the DATA[29:0] signals at one input and has its other input connected to the output of a 30-bit adder 632. The adder 632 has one input connected to the output of another 30-bit register ΔZM 630, which receives the DATA[29:0] signals at its input. The clock input of the ΔZM register 630 receives a signal DZMSEL. The other input of the adder 632 is connected to the output of a 30-bit register ZMAIN 636, where the input of the ZMAIN register 636 is connected to the output of the MUX 634. The ZMAIN register 636 receives a signal ZMSEL at its clock input. The signal MLOAD is connected to the select input of the MUX 634.

The ZMAIN_INT and ZMAIN_FRAC values from register R5 are asserted on the DATA[29:0] signals and loaded into the ZMAIN register 636 while the MLOAD signal is asserted and when the ZMSEL signal is clocked. Likewise, the ΔZMAIN_INT and ΔZMAIN_FRAC values from register R6 are asserted on the DATA[29:0] signals and loaded into the ΔZM register 630 while the MLOAD signal is asserted and when the DZMSEL signal is clocked. All 30 bits of the ZMAIN register 636, referred to as the ZM[29:0] signals, provide a partially determined depth value for each initial pixel along the main slope. Once these registers are loaded and the MLOAD signal is negated, the ZMSEL signal is clocked to interpolate the depth parameter, where the contents of the ZMAIN register 636 is added to the contents of the ΔZM register 630, and the sum is loaded back into the ZMAIN register 636. The ZMSEL signal is clocked after the current orthogonal span line is completed, to provide a depth value of the initial pixel of the next orthogonal scan line.

Figure 6D:
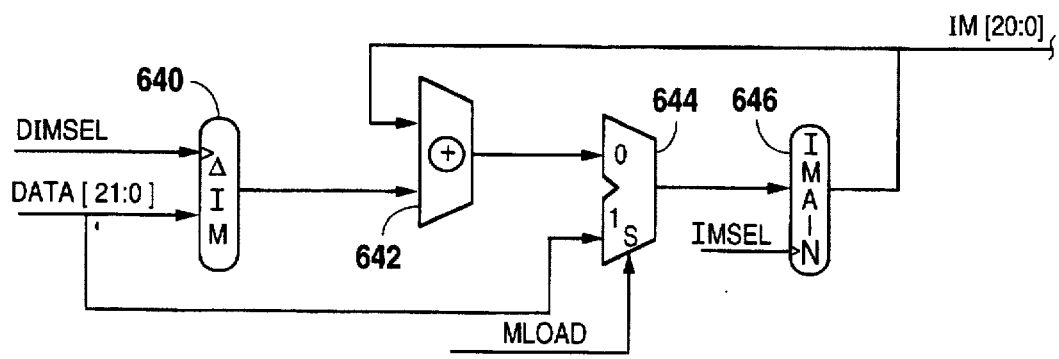

Referring now to FIG. 6D, a schematic diagram of the main slope interpolator for the color intensity parameter is shown. When drawing and filling polygons according to the present invention, this portion of the interpolator provides the intensity value of each initial pixel along the main slope of the polygon being drawn. These values may be modified by the alpha values to simulate transparency. A two-input, 22-bit MUX 644 receives the DATA[21:0] signals at one input and has its other input connected to the output of a 22-bit adder 642. The adder 642 has one input connected to the output of a 22-bit register ΔIM 640, which also receives the DATA[21:0] signals at its input. A signal DIMSEL is provided to the clock input of the AIM register 640. The other input of the adder 642 is connected to the output of a 22-bit register IMAIN 646, where the input of the IMAIN register 646 is connected to the output of the MUX 644. The clock input of the IMAIN register 646 receives a signal IMSEL, and the MLOAD signal is connected to the select input of the MUX 644.

The IMAIN_INT and IMAIN_FRAC values from register R7 are asserted on the DATA[21:0] signals and loaded into the IMAIN register 646 while the MLOAD signal is asserted and when the IMSEL signal is clocked. Likewise, the ΔIMAIN_INT and ΔIMAIN_FRAC values from register R8 are asserted on the DATA[21:0] signals and loaded into the ΔIM register 640 while the MLOAD signal is asserted and when the DIMSEL signal is clocked. The upper 21 bits of the IMAIN register 646, referred to as the IM[20:0] signals, provide a partially determined intensity value for each initial pixel along the main slope. Once these registers are loaded and the MLOAD signal is negated, the IMSEL signal is clocked to interpolate the depth parameter, where the contents of the IMAIN register 646 is added to the contents of the ΔIM register 640, and the sum is loaded back into the IMAIN register 646. The IMSEL signal is clocked after the current orthogonal scan line is completed to provide an intensity value of the initial pixel of the next orthogonal scan line.

Figure 6E:
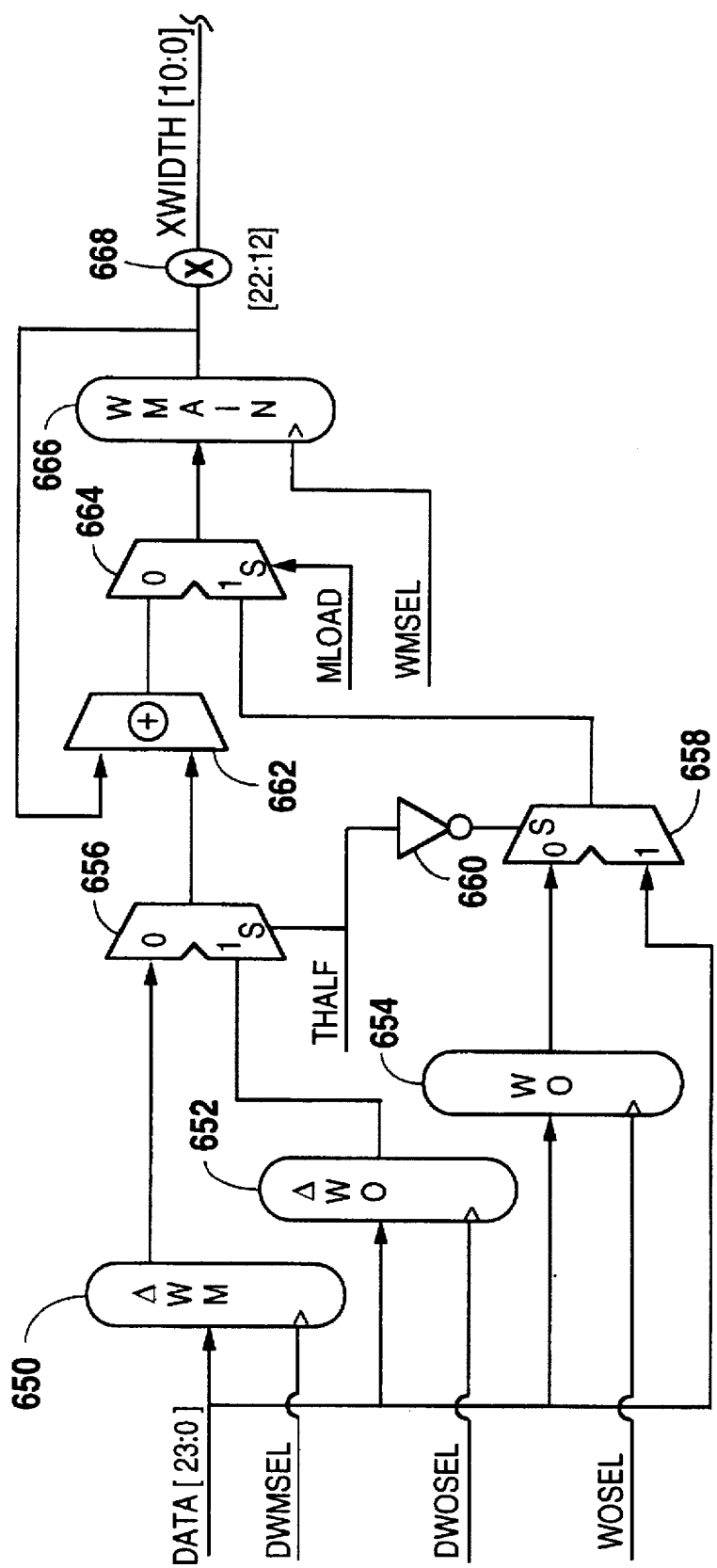

Referring now to FIG. 6E, a schematic diagram of the interpolator for the width parameter is shown. Three registers ΔWM 650, ΔWO 652 and WO 654 each have data inputs for receiving the DATA[23:0] signals and clock inputs receiving signals DWMSEL, DWOSEL and WOSEL, respectively, for loading the width values ΔWMAIN_INT and ΔWMAIN_FRAC, ΔWOPP_INT and ΔWOPP_FRAC, and WOPP_INT and WOPP_FRAC, respectively, from the registers R9, R12 and R11, respectively. A first two-input, 24-bit MUX 656 receives the outputs of the ΔWM 650 and ΔWO 652 registers at its data inputs and receives the THALF signal at its select input. The THALF signal is provided to the input of an inverter 660, which has its output connected to the select input of another two-input, 24-bit MUX 658. One input of the MUX 658 receives the DATA[23:0] signals and its other input is connected to the output of the WO register 654. The output of the MUX 658 is connected to one input of a two-input, 24-bit MUX 664, which provides its output to the input of a 24-bit register WMAIN 666. The output of the WMAIN register 666 is provided to one input of a 24-bit adder 662, which has its other input connected to the output of the MUX 656. The output of the adder 662 is connected to the other input of the MUX 664. The MLOAD signal is provided to the select input of the MUX 664 and the WMAIN register 666 receives a signal WMSEL at its clock input. The upper 11 bits [22:12] at the output of the WMAIN register 666 are connected through a tap 668 to provide signals XWIDTH[10:0], which define the width of the polygon at each orthogonal scan line. Again, the XWIDTH[10:0] signals define a count value for each orthogonal span line to determine the number of pixels per scan line.

While the THALF signal is initially asserted low, the WMAIN_INT and WMAIN_FRAC values from the register R9 in the register file 500 are asserted on the DATA [23:0] signals and loaded into the WMAIN register 666 while the MLOAD signal is asserted and when the WMSEL signal is clocked. When the MLOAD signal is negated and while the THALF signal remains asserted low, the contents of the ΔWM register 650 is added to the contents of the WMAIN register 666 and stored back into the WMAIN register 666 each time the WMSEL signal is clocked. The WMSEL signal is clocked at the beginning of each orthogonal scan line to be drawn while drawing the main portion of the polygon, until the count value MS_COUNTM:LS_COUNTM is completed. Then, the THALF signal is asserted and the MLOAD signal is pulsed to load the WMAIN register 666 with the WOPP_INT and WOPP_FRAC values from the WO register 654. Then, after the MLOAD signal is negated and while the THALF signal is still asserted, the contents of the ΔWO register 652 is added to the contents of the WMAIN register 666 and the sum stored back into the WMAIN register 666 each time the WMSEL signal is clocked. The WMSEL signal is clocked at the beginning of each orthogonal scan line to be drawn while drawing the opposite portion of the polygon, until the count value MS_COUNTO:LS_COUNTO is decremented to zero or otherwise completed, thereby completing the polygon.

Figure 6F:
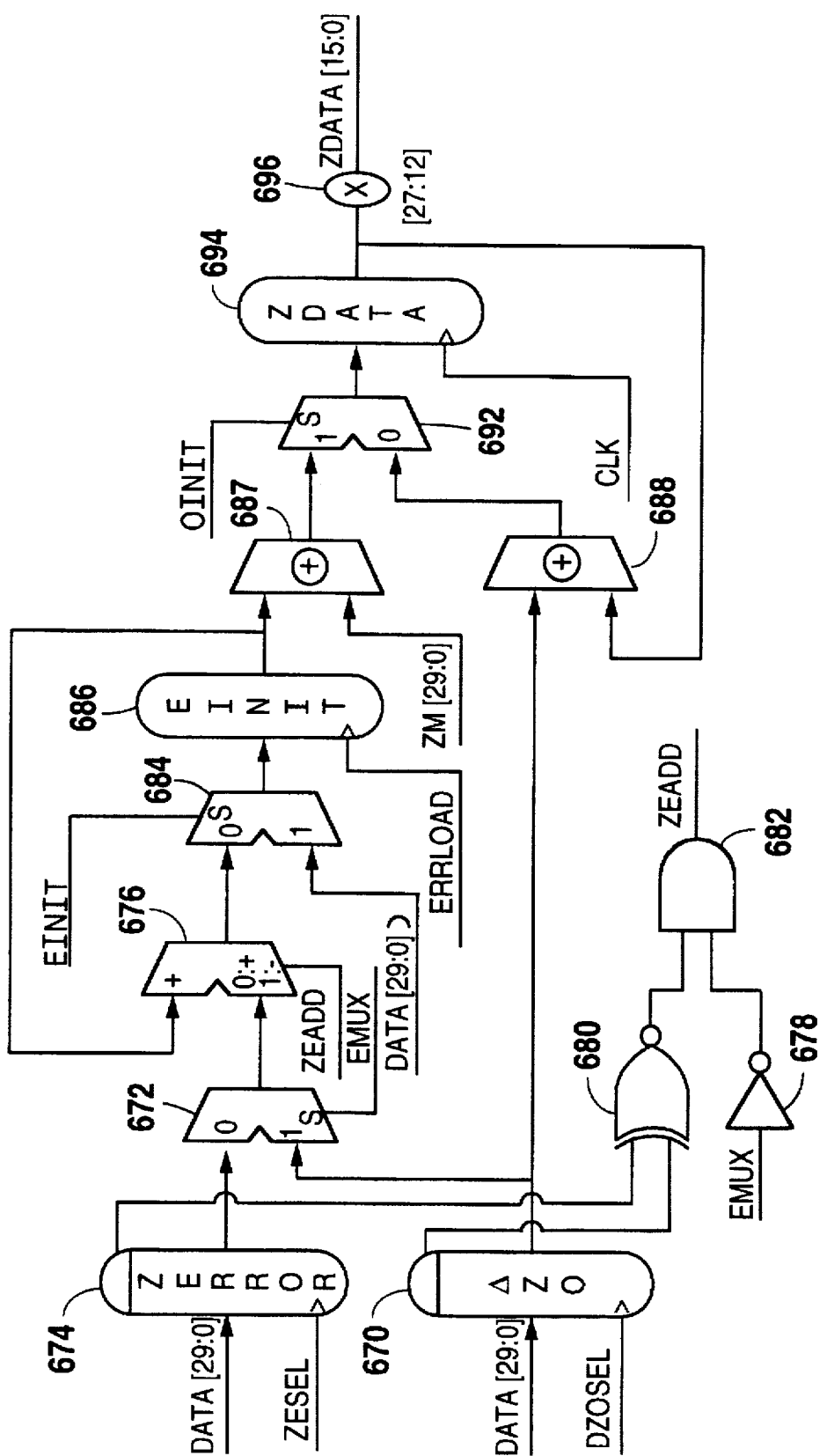

Referring now to FIG. 6F, a schematic diagram of an orthogonal and depth error interpolator for the depth parameter is shown. A signal ZESEL is provided to the clock input of a 30-bit register ZERROR 674, which has its input receiving the DATA [29:0] signals. The ZERROR_INT and ZERROR_FRAC values from register R13 are loaded into the ZERROR register 674 when asserted on the DATA [29:0] signals and when the ZESEL signal is clocked. Likewise, a signal DZOSEL is connected to the clock input of a 32-bit register ΔZO 670, which has its input receiving the DATA [29:0] signals. The ΔZORTHO_INT and ΔZORTHO_FRAC values from register. R14 are loaded into the register ΔZO register 670 when asserted on the DATA [29:0] signals and when the DZOSEL signal is clocked.

The output of the ZERROR register 674 is connected to one input of a two-input, 30-bit MUX 672, having its other input connected to the output of the ΔZO register 670. The output of the MUX 672 is connected to one input of a 30-bit arithmetic logic unit (ALU) 676, having its output connected to one input of a two-input, 30-bit MUX 684. The DATA [29:0] signals are provided to the other input of the MUX 684. The output of the MUX 684 is connected to the input of an EINIT register 686, which has its output connected to one input of a 30-bit adder 687 and to the other input of the ALU 676. A signal EINIT is provided to the select input of the MUX 684 and a signal ERRLOAD is provided to the clock input of the EINIT register 686. An initial error value, which is preferably zero, is asserted on the DATA[29:0] signals and loaded into the EINIT register 686 while the EINIT signal is asserted high and the ERRLOAD signal is clocked. Thereafter, the EINIT signal is negated while the polygon is interpolated.

The ZM[29:0] signals are provided to the other input of the adder 687, which has its output connected to one input of a two-input, 30-bit MUX 692. The output of the MUX 692 is connected to the input of a ZDATA register 694, which has its output connected to one input of an adder 688. The other input of the adder 688 is connected to the output of the ΔZO register 670. The output of the adder 688 is provided to the other input of the MUX 692. The MUX 692 receives the OINIT signal at its select input. The integer portion bits [27:12] of the ZDATA register are provided to a tap 696 for providing data signals ZDATA [15:0]. The clock input of the ZDATA register 694 receives the CLK clock signal.

The EMUX signal is provided to the input of an inverter 678 and also to the select input of the MUX 672, where the MUX 672 selects the contents of the ZERROR register 674 when the EMUX signal is asserted high and selects the contents of the ΔZO register 670 when the EMUX signal is asserted low. The output of the inverter 678 is connected to one input of a two-input AND gate 682, having its other input connected to the output of a two-input exclusive-NOR (XNOR) gate 680. The sign or MSB bits of the ZERROR register 674 and the ΔZO register 670 are connected to the two inputs, respectively, of the XNOR gate 680. The output of the AND gate 682 provides a signal ZEADD, which is provided to a control input of the ALU 676. The ALU 676 adds its inputs when the ZEADD signal is asserted low, and subtracts the output of the MUX 672 from the contents of the EINIT register 686 when the ZEADD signal is asserted high.

Once the initial values are loaded into the ZERROR, ΔZ0 and EINIT registers 674, 670 and 686 as described previously, the OINIT signal is asserted and the CLK signal is clocked so that the contents of the ZMAIN register 636 asserted on the ZM[29:0] signals is added to the contents of the EINIT register 686 by the adder 687 and the sum is loaded into the ZDATA register 694. Thus, the initial depth value is asserted on the ZDATA[15:0] signals from the ZDATA register 694. If the initial width is zero, such as is the case for the triangle 400 of FIG. 4, the first orthogonal span line is completed with one pixel. However, if the initial width is not zero, the OINIT signal is negated and the CLK signal is asserted for each remaining pixel in the initial orthogonal span line. Each time the CLK signal is asserted, the ΔZORTHO_INT:ΔZORTHO_FRAC value in the ΔZ0 register 670 is added to the contents of the ZDATA register 694 by the adder 688, and the sum is loaded into the ZDATA register 694.

After an orthogonal span line is completed, the ERR-LOAD signal is asserted so that the output of the ALU 676 is loaded into the EINIT register 686. If the sign bit of the depth error value in the ZERROR register 674 is equal to the sign bit of the z orthogonal slope value in the ΔZ0 register 670, the ALU 676 subtracts the contents of the ZERROR register 674 from the contents of the EINIT register 686 while the EMUX signal remains low or 0, and this difference is loaded back into the EINIT register 686. If the sign bits of the z error and orthogonal slope values in these registers 674, 670 are different, however, then the ALU 676 adds the contents of the ZERROR and EINIT registers 674 and 686. Thus, if both values are negative or if the z error value is positive and the z orthogonal slope value is negative, then a positive error value accumulates in the EINIT register 686. Otherwise, a negative value accumulates in the EINIT register 686. In this manner, the error accumulated in the EINIT register has the opposite sign as that of the ΔZORTHO_INT:ΔZORTHO_FRAC value in the ΔZO register 670.

When an overflow of the fractional portion of the x parameter occurs, the EMUX signal is asserted and the ERRLOAD signal is clocked again by the controller 504. When this occurs, the ZORTHO_INT:ZORTHO_FRAC value in the ΔZ0 register 670 is added to the contents of, and stored back into, the EINIT register 686. It is noted that since the sign of the z orthogonal slope value is always opposite that of the error value accumulated in the EINIT register 686, the orthogonal slope value always reduces the absolute value of the error accumulated in the EINIT register 686. In this manner, the error is incrementally accumulated in the EINIT register 686 and then the orthogonal slope value is subtracted out when the fractional portion of the x parameter overflows causing the orthogonal span line to shift one pixel.

Once the contents of the EINIT register 686 are adjusted in the manner described above, the OINIT signal is asserted by the controller 504 and the CLK signal is clocked to load the z value of the initial pixel in the next orthogonal span line into the ZDATA register 694. Then the OINIT signal is negated and the CLK signal is clocked for each adjacent pixel in the orthogonal scan line, where the contents of the ΔZ0 register 670 are once again added to the contents of the ZDATA register 694 for each pixel. In this manner, once the z depth value of the initial pixel value is adjusted by the value accumulated in the EINIT register 686, z depth values of the entire orthogonal span line is correspondingly shifted or otherwise adjusted. Also, when the EMUX signal is asserted, the magnitude of the accumulated error value is reduced by the depth orthogonal slope value, to allow a smooth transition of the depth characteristic when the next orthogonal span line is shifted. It is noted that a shift of the orthogonal span line may occur each time if the value in the ΔXMI register is greater than zero. However, the EMUX signal is only asserted upon fractional overflow in the adder 614.

Figure 6G:
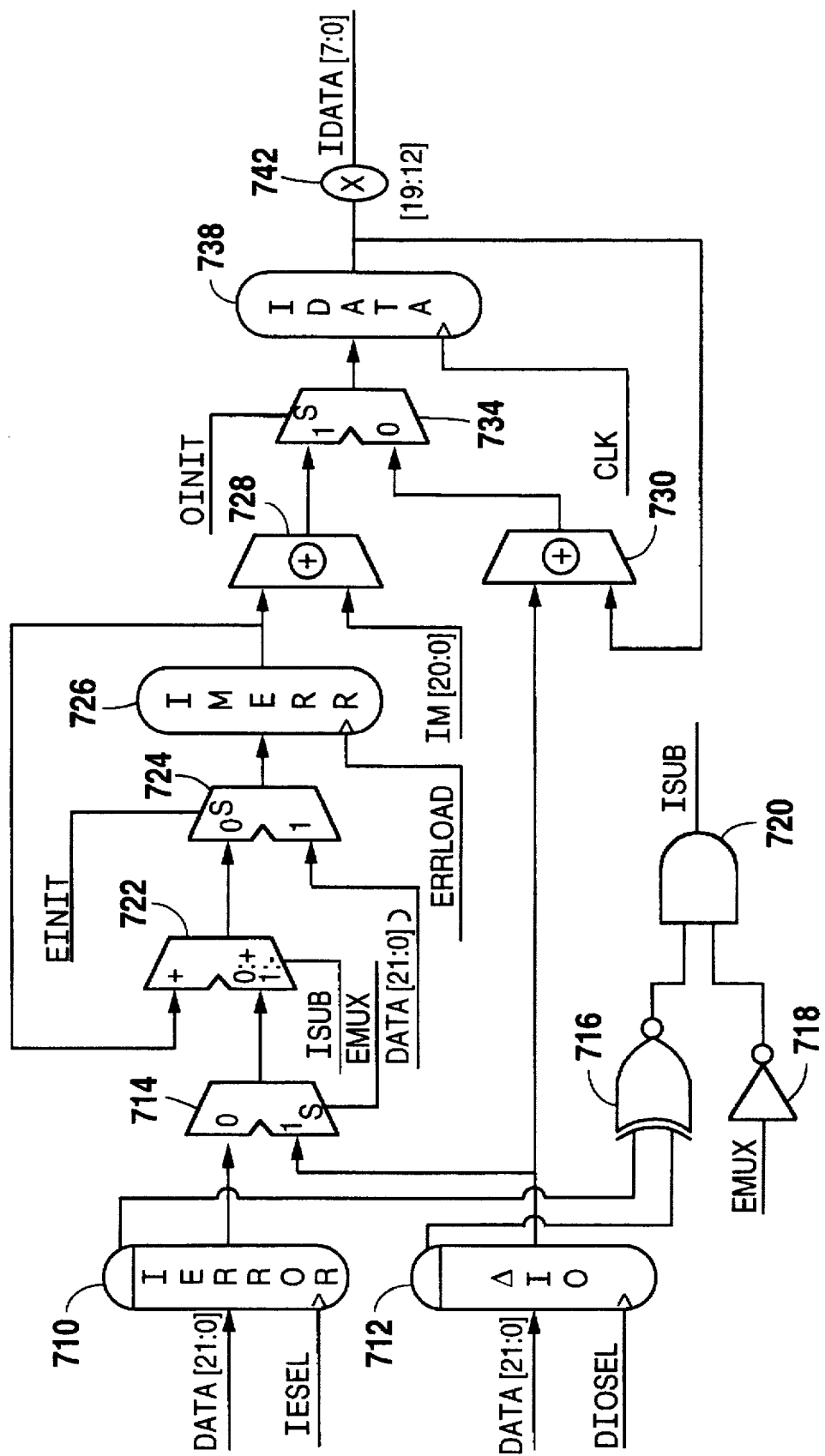

Referring now to FIG. 6G, a schematic diagram of an orthogonal and intensity error interpolator for the intensity parameter is shown. A signal IESEL is provided to the clock input of a 22-bit register IERROR 710, which receives the DATA [21:0] signals at its data input. The IERROR_INT and IERROR_FRAC values from register R15 are loaded into the IERROR register 710 when asserted on the DATA [21:0] signals when the IESEL signal is clocked. A signal DIOSEL is provided to the clock input of a 22-bit register ΔIO 712, which receives the DATA [21:0] signals at its data input. The ΔIORTHO_INT and ΔIORTHO_FRAC values from register R16 are loaded into the ΔIO register 712 when asserted on the DATA [21:0] signals and when the DIOSEL signal is clocked.

The output of the IERROR register 710 is provided to one input of a 22-bit, two-input MUX 714, which has its other input connected to the output of the ΔIO register 712. The select input of the MUX 714 receives the EMUX signal and its output is connected to one input of a 22-bit ALU 722. The output of the ALU 722 is connected to one input of a 22-bit, two-input MUX 724, which has its output connected to the input of a 22-bit register IMERR 726. The output of the IMERR register 726 is connected to the other input of the ALU 722. The MUX 724 receives the EINIT signal at its select input and the IMERR register 726 receives the ERR-LOAD signal at its clock input. Both of the sign bits of the IERROR register 710 and the ΔIO register 712 are provided to both inputs of a two-input XNOR gate 716, which has its output connected to one input of a two-input AND gate 720. The EMUX signal is provided to the input of an inverter 718, which has its output connected to the other input of the AND gate 720. The AND gate 720 provides a signal ISUB at its output, which is connected to the control input of the ALU 722. The ALU 722 adds its inputs if the ISUB signal is low or 0 and subtracts the output of the MUX 714 from the contents of the IMERR register 726 if the ISUB signal is asserted high or 1.

The output of the IMERR register 726 is connected to one input of an adder 728, which receives the IM [20:0] signals at its other input. The output of the adder 728 is connected to one input of a MUX 734. The output of the MUX 734 is connected to the input of an 22-bit register IDATA 738, which has its output connected to one input of an adder 730. The integer output bits [19:12] of the IDATA register 738 are provides to a tap 742, which provides the intensity signals IDATA[7:0] to the operation engine 212. The output of the adder 730 is connected to the other input of the MUX 734. The clock input of the IDATA register 738 receives the CLK signal, and the MUX 734 receives the OINIT signal at its select input. The output of the ΔIO register 712 is connected to the other input of the adder 730.

The operation of the intensity orthogonal slope and i error value interpolator is very similar to the operation described above for the z orthogonal slope and z error value interpolator described above. Once again, an initial intensity error value is loaded into the IMERR register 726 when the EINIT signal is asserted and the ERRLOAD signal is clocked. This value, which is preferably zero, is added to the IM[20:0] signals from the register 646 by the adder 728 and loaded into the IDATA register 738 while the OINIT signal is asserted and when the CLK signal is clocked. Thereafter, the EINIT signal is negated and the ERRLOAD signal is clocked for the initial pixel of each orthogonal span line. In this manner, the intensity of each initial pixel at the beginning of each orthogonal span line is corrected by the accumulated intensity error value stored in the IMERR register 726.

The contents of the IERROR register 710 is either added to or subtracted from the contents of the IMERR register 726 each time the ERRLOAD signal is clocked and while the EMUX signal is negated low. In a similar manner as described above for the depth error value, if the sign of the intensity orthogonal slope value in the ΔIO register 712 is negative, the accumulated intensity error value in the IMERR register 726 is positive and vice-versa. If the EMUX signal is asserted indicating an overflow of the fractional portion of the x parameter, the intensity orthogonal slope value is added to the contents of the IMERR register 726 to reduce the magnitude of the accumulated intensity error. Once the intensity value of the initial pixel in the orthogonal span line is determined in this manner and loaded into the IDATA register 738, the OINIT signal is negated and the remaining intensity value for the orthogonal span line are interpolated each time the CLK signal is clocked, where the contents of the ΔIO register 712 are added to the contents of, and stored back into, the IDATA register 738.

As for the z error values, the i intensity error values accumulated in the IMERR register 728 incrementally shift the intensity values of each pixel in the orthogonal span line until the accumulated error rises above the intensity or orthogonal slope value. This occurs when the fractional portion of the x parameter overflows, causing the initial pixel to jump one additional column over. At this point, the intensity orthogonal slope is added in to reduce the magnitude of the accumulated intensity error value and to adjust the intensity value of the initial pixel of the next orthogonal span line. In this manner, the intensity values across the face of the polygon have less differential resulting in smoother color transition of the shading.

Figure 6H:
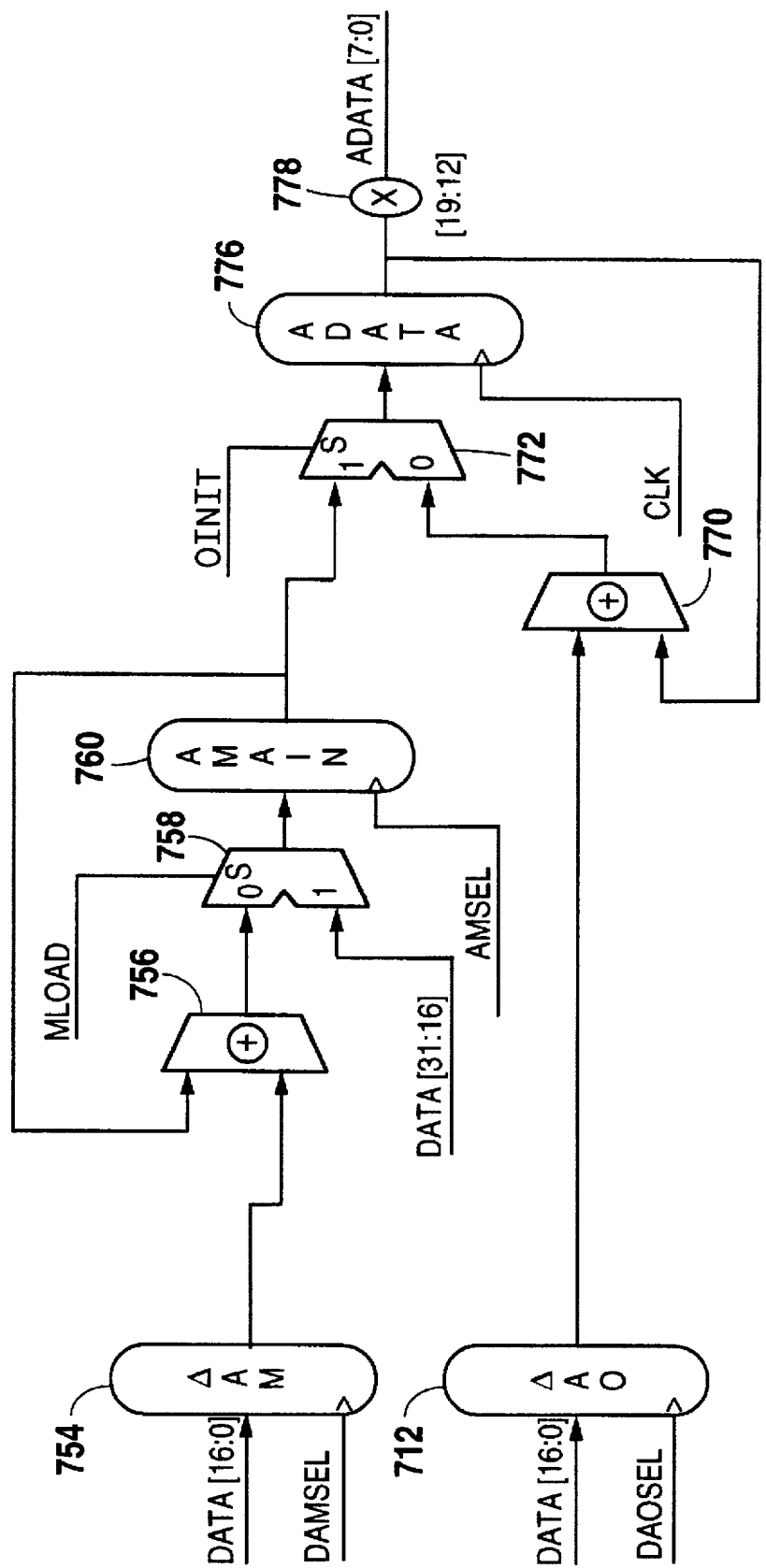

Referring now to FIG. 6H, a schematic diagram of an interpolator for the alpha values is shown. A signal DAOSEL is provided to the clock input of a 17-bit register ΔAO 752 and a signal DAMSEL is connected to the clock input of a 17-bit register ΔAM 754. The DATA [15:0] signals are provided to the inputs of the ΔAM register 754 and the ΔAO 752. Thus, the ΔAORTHO_INT and ΔAORTHO_FRAC values from the register R17 are loaded into the ΔAO register 752 when asserted on the DATA[15:0] signals and when the DAOSEL signal is clocked. Likewise, the values ΔAMAIN_INT and ΔAMAIN_FRAC values from register R18 are loaded into the data register 754 when asserted on the DATA [15:0] signals and when the DAMSEL signal is clocked. The DATA [31:16] signals are provided to one input of a two-input, 17-bit MUX 758, which receives the MLOAD signal at its select input. The output of the MUX 758 is provided to the input of a 17-bit register AMAIN 760, which receives a signal AMSEL at its clock input. The AMAIN_INT and AMAIN_FRAC values from register R18 are loaded into the AMAIN register 760 when asserted on the DATA [31:16] signals while the MLOAD signal is asserted and when the AMSEL signal is clocked. It is noted that the ΔAM and AMAIN registers 754, 760 are preferably loaded at the same time from register R18.

The output of the ΔAO register 752 is connected to one input of a two-input, 17-bit adder 770. The output of the adder 770 is provided to one input of a 17-bit, two-input MUX 772, which has its output connected to a 17-bit register ADATA 776. The ADATA register 776 receives the CLK signal at its clock input, and its output integer bits [19:12] are provided to a tap 778, which correspondingly provides the ADATA [7:0] signals. The output of the ADATA register 776 is provided to the other input of the adder 770. The select input of the MUX 772 receives the OINIT signal. The output of the ΔAM register 754 is connected to one input of a 17-bit adder 756, which has its output connected to the other input of the MUX 758. The output of the AMAIN register 750 is provided to the other input of the adder 756, and also to the other input of the MUX 772.

Figure 7:
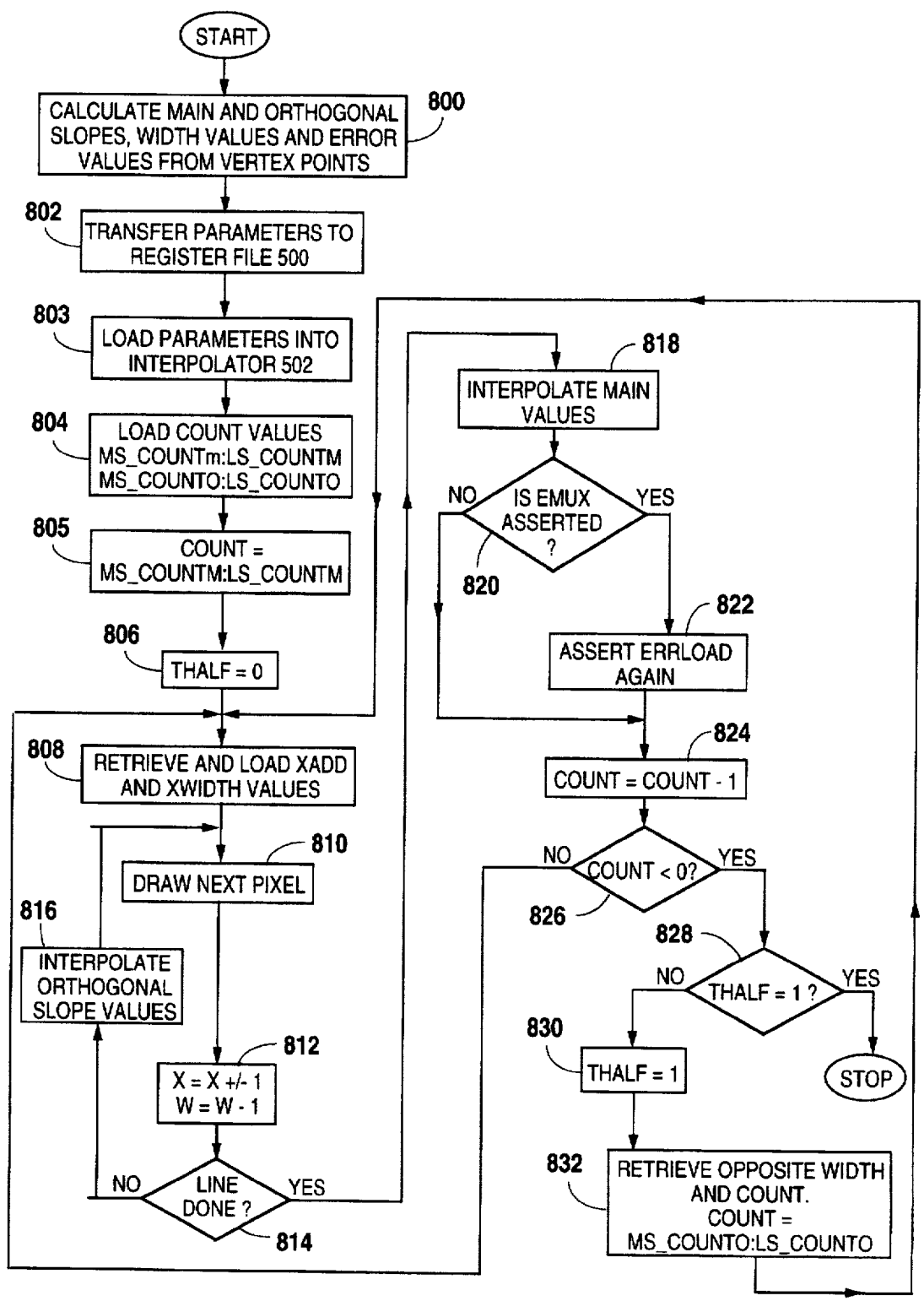
FIG. 7 is a flowchart diagram illustrating the interpolation procedure performed by the software driver and the graphics processor of FIG. 1.

Referring now to FIG. 7, a flowchart diagram is shown illustrating the interpolation procedure performed by the software driver and the controller 504 to control the interpolator 502. Operation begins at step 800 where a polygon to be drawn is tessellated into randomly-oriented triangles if the polygon is a general polygon not having a single main slope and is not to be drawn with a single command. The tessellation procedure will be described more fully below. It is noted that all randomly-oriented triangles and certain other four and five-sided polygons, such as shown in FIGS. 3A–3C, are also drawn with a single command if they follow the rules described previously. Thus, the term polygon is used rather than triangle. If the polygon was tessellated into multiple triangles or other single-command polygons, then the remaining steps are performed for each of the resulting sub-triangles or polygons forming the single larger tessellated polygon.

Operation proceeds to step 801 where the software driver executed by the CPU 128 receives the vertex points of a polygon or each tessellated triangle and correspondingly calculates the parameters for the base point, the main and orthogonal slopes, as well as the depth and intensity error values. Of course, an error value for the alpha values could also be calculated at this time. Operation proceeds to step 802 where either the CPU 128 or the graphics processor 100 transfers the calculated parameters to the private memory 116, and thereafter the parameters are transferred to the register file 500 within the graphics processor 100. Operation proceeds to step 803, where the controller 504 receives instructions from the instruction decode and control logic 204 to begin the interpolation process. Thus, the controller 504 loads the parameters from the register file 500 into the various registers of the interpolator 502.

From step 803, operation proceeds to step 804, where the count values MS_COUNTM:LS_COUNTM and MS_COUNTO:LS_COUNTO are loaded into corresponding registers within the controller 504. Operation proceeds to step 805, where a count value is set equal to the MS_COUNTM:LS_COUNTM value. The count value may be implemented by a timer or counter and incremented or decremented as known to those skilled in the art. From step 805, operation proceeds to step 806 where the controller sets the THALF signal 20 to initiate drawing the first or lower half of the polygon.

Operation then proceeds to step 808 where the controller 504 loads the x parameter from the XADD[11:0] signals into the counter C1 and loads the w width parameter from the XWIDTH[10:0] signals into the counter C2. Operation proceeds to step 810 where the next pixel is drawn, which during the first iteration is the first or base point of the polygon. It is noted that even if the width is zero, at least one pixel will be drawn during step 810. To draw a pixel, the controller 504 asserts the appropriate address on the LBUS 118 to access the corresponding pixel in the frame buffer 110, while the operation 212 and the OFIFOs 214 also assert the appropriate characteristic values for loading into the frame buffer 110. The interpolator 502 provides the appropriate ZDATA, IDATA and ADATA values to the operation engine 212 and the Z-buffer comparator 206, as described previously.

From step 810, operation proceeds to step 812 where the x address in the counter C1 is either incremented or decremented by 1, depending upon the x direction bit. Also, the width value in the counter C2 is decremented. Operation then proceeds to step 814, where the line done bit is checked to determine whether the current orthogonal span line is completed or not. It is noted that the direct use of the width value as a count provides fast and efficient performance rather than using maximum and incremented x values and a comparator. If it is determined in step 814 that the orthogonal span line is not yet complete, operation proceeds to step 816, where the controller 504 interpolates the orthogonal slope values for the depth, intensity and alpha values. In this case, the OINIT is negated so that the controller 504 asserts the CLK signal to clock the ZDATA, IDATA and ADATA registers 694, 738 and 776. As described previously, the values in these registers are incremented through the adders 688, 730 and 770, respectively, by the values in the $\Delta$ZO, $\Delta$IO and $\Delta$AO registers 670, 712 and 752, respectively. From step 816, operation proceeds back to step 810 to draw the next pixel with the new characteristic values.

Referring back to step 814, if it is determined that the current orthogonal span line is complete, operation proceeds to a step 818 where the controller 504 interpolates the main slope values for the parameters x, y, z, i, a and w. Thus, the controller 504 clocks the XMSEL, YMSEL, ZMSEL, IMSEL, WMSEL and AMSEL signals to clock the XADD, YADD, ZMAIN, IMAIN, WMAIN and AMAIN registers 602, 626, 636, 646, 666 and 760, respectively. Also, the ERRLOAD signal is asserted to clock the EINIT and IMERR registers 786, 726, respectively, to load in the error values from the ZERROR and IERROR registers 674 and 710. While the OINIT signal is asserted, the CLK signal is asserted to clock the ZDATA, IDATA and ADATA registers 694, 638 and 776. In this manner, the main values are interpolated to determine the characteristics of the initial pixel of the next orthogonal span line.

From step 818, operation proceeds to step 820, where the controller 504 determines if the EMUX signal is asserted indicating the need to reduce the magnitude of the accumulated error values in the EINIT and IMERR registers 686 and 726. If so, operation proceeds to step 822 where the ERRLOAD signal is again asserted while the EMUX signal is asserted to add the contents of the $\Delta$ZO and $\Delta$IO registers 670, 712 to the contents of the registers EINIT and IMERR 686, 726, respectively. If the EMUX signal is not asserted as determined in step 820 or after step 822 is performed, operation proceeds to step 824.

In step 824, the count value indicating the number of orthogonal lines is decremented. From step 824, operation proceeds to step 826 where the controller 504 compares the count to 0. If the count is not less than 0, then more orthogonal lines must be drawn and operation proceeds back to step 808 where a new x' value is calculated. However, if the count has become less than 0 in step 826, operation proceeds to step 828, where the controller 504 compares the THALF signal to 1. If the THALF signal equals 1 in step 828, then the polygon has been completely drawn, and operation terminates. However, if the THALF signal does not equal 1, operation proceeds to step 830 where the THALF signal is set equal to 1. Then operation proceeds to step 832 where the controller 504 retrieves the opposite width values from the interpolator 502, and loads the opposite count values MS_COUNT0:LS_COUNT0 into the count value. To load the width values, the MLOAD signal is asserted and the WMSEL signal is clocked to load the initial opposite width value loaded in the WO register 654 to the WMAIN register 666. Thereafter, the MLOAD signal is negated and since the THALF signal now equals 1, the contents of the $\Delta$WO register 652 will be added to the contents of the WMAIN register 666 through the adder 662 and loaded back into the WMAIN register 666 with each assertion of the WMSEL signal. From step 832, operation proceeds back to step 808 to draw the opposite portion of the polygon in a similar manner as the main portion.

Figure 8A:
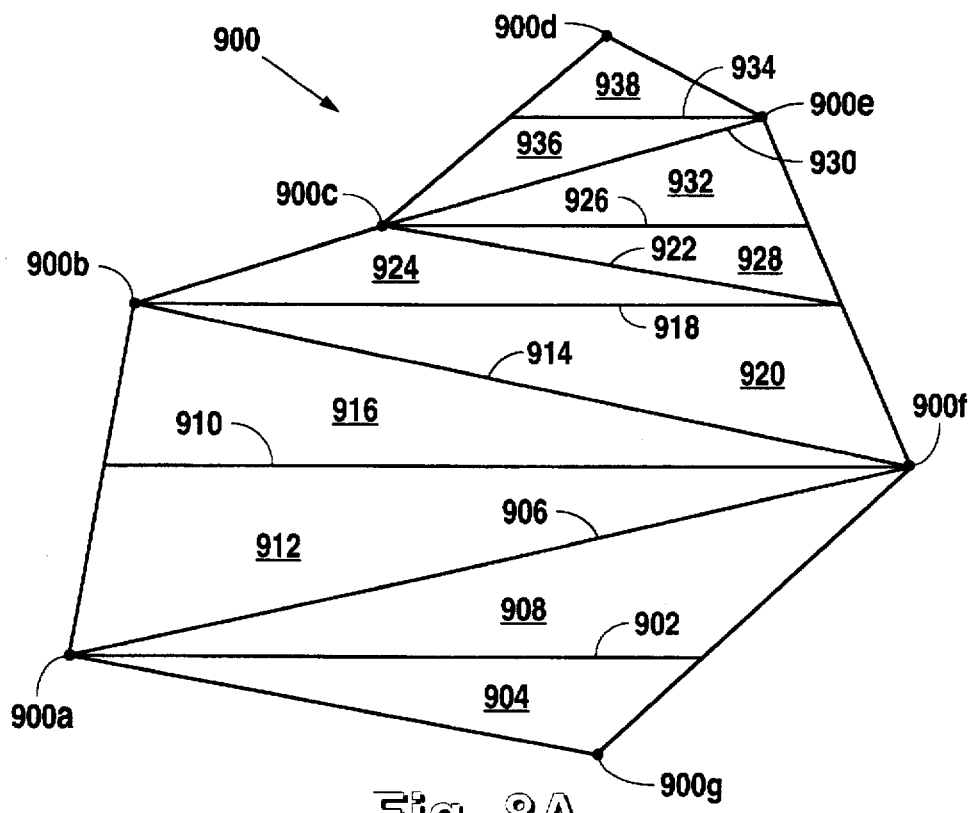
FIG. 8A is a diagram illustrating a tessellation procedure according to prior art performed on a polygon having more than three sides.
Figure 8B:
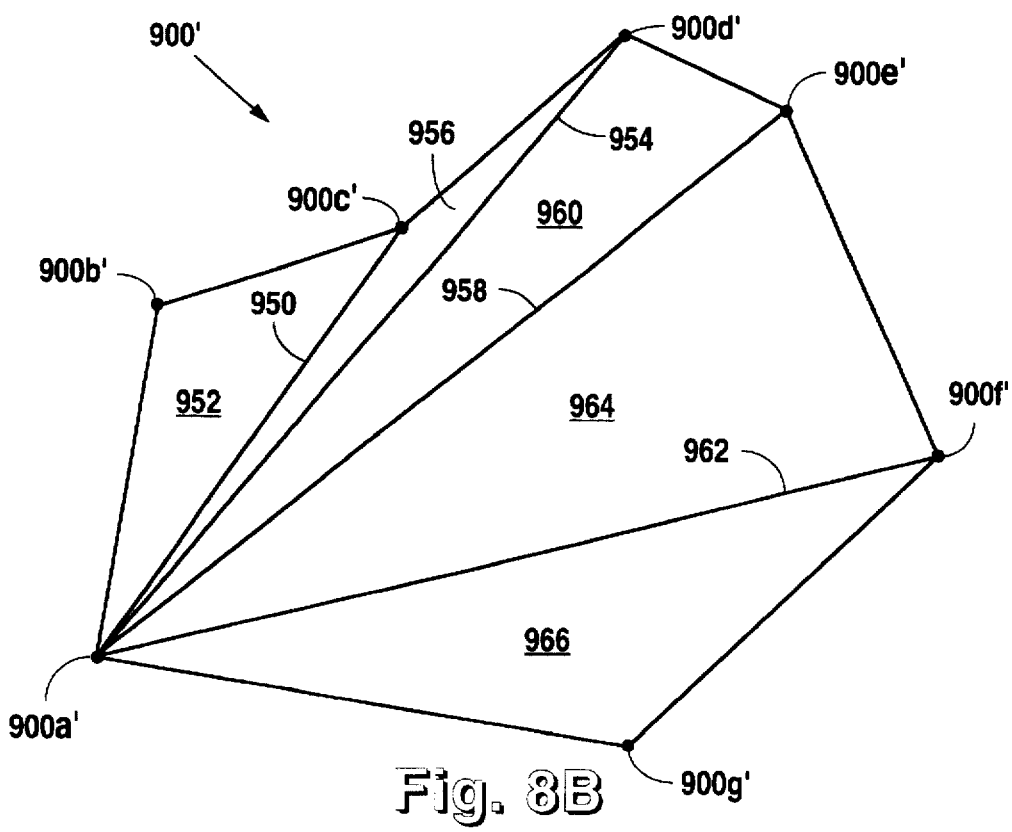
FIG. 8B is a diagram illustrating a tessellation procedure according to the present invention performed on the same polygon of FIG. 8A.

FIGS. 8A and 8B are provided to illustrate the differences between tessellation of prior art and tessellation for interpolation rendering according to the present invention. Referring now to FIG. 8A, a seven-sided polygon 900 is shown with corresponding vertices 900a, 900b, 900c, 900d, 900e, 900f and 900g. The polygon 900 is tessellated according to prior art by dividing the polygon 900 into several orthogonally-oriented triangles for interpolation by interpolation logic according to prior art. The starting point is the vertice 900a, although any one of the vertices 900a–900g could be used to initiate the process. In particular, a first orthogonal vector 902 is drawn from vertice 900a to an intersection point along the side 900f–900g of the polygon 900 forming a first orthogonally-oriented triangle 904. A second vector 906 is drawn between vertices 900f, 900a forming a second orthogonally-oriented triangle 908. Operation proceeds in a similar manner where vectors 910, 914, 918, 922, 926, 930 and 934 are drawn to define orthogonally-oriented triangles 912, 916, 920, 924, 928, 932, 936 and 938. In this manner, nine different vectors are drawn to separate the polygon 900 into ten different orthogonally-oriented triangles according to the tessellation procedure of the prior art. The prior art software driver would then calculate the various parameters for each of the triangles 904, 908, 912, 916, 920, 924, 928, 932, 936 and 938 and then pass these parameters to the interpolation logic for separately drawing the ten different triangles. Thus, a separate command must be passed to the interpolator logic for each of these triangles.

Referring now to FIG. 8B, an identical seven-sided polygon 900' is shown having corresponding vertices 900a', 900b', 900c', 900d', 900e', 900f' and 900g'. Since the present invention allows interpolation of randomly-oriented triangles, the tessellation procedure is substantially simplified. A first vector 950 is drawn between an origin vertice 900a' and vertice 900c' to form a first triangle 952. Then, another vector 954 is drawn between vertices 900a', 900d, forming another triangle 956. This procedure is continued in like manner where vectors 958 and 962 are drawn to form triangles 960, 964 and 966 to complete the tessellation procedure of the polygon 900'. In this manner, only four vectors 950, 954, 958 and 962 are drawn to separate the polygon 900' into five triangles 952, 956, 960, 964 and 966 which are randomly-oriented in that they have no orientation restriction whatsoever. The parameters for each of these triangles are then passed by the software driver to the graphics processor 100 according to the present invention in the form of commands and associated parameters as described previously. It is clear that the tessellation procedure is simplified since vectors are only drawn between already defined vertices to separate the polygon 900' into the triangles rather than having to define new vertices to assure orthogonal orientation. This allows the polygon to be divided into a fewer number of triangles. Therefore, an interpolation method according to the present invention allows dramatic reduction of the tessellation procedure.

It is noted that general polygons are preferably divided into triangles, but could also be divided into a plurality of single-command polygons having a single main slope and a few other restrictions as described previously.

It can now be appreciated that a method for interpolating polygons into a pixel grid according to the present invention is a substantial improvement over interpolating techniques of prior art. In brief, a software driver determines initial and incremental width values for interpolating the width of triangles and other polygons, rather than edge-walking the opposite slopes. These polygons have a main slope, up to two opposite slopes and up to three orthogonal sides. The interpolated width value is loaded into a counter and decremented for each pixel in the current scan line. When the width counter reaches zero or terminal count, it asserts a corresponding line done signal indicating that the line is complete. In this manner, extra logic such as a comparator is not required to form a comparison after each pixel while an orthogonal line is being drawn into the pixel grid. For each polygon, a main slope is determined which traverses the vertical or reference extent of the polygon, so that the remaining sides are considered opposite slopes. Width and corresponding count values are defined for each opposite slope forming two halves of each polygon. Multiplexer logic is preferably added to switch to separate pre-loaded registers to access second half parameters after the first half of the polygon is completed. In this manner, interpolation is performed once according to a single for the entire polygon rather than for two separate polygons, resulting in faster interpolation of polygons.

A substantial benefit of interpolating polygons according to the present invention is a substantial reduction in the complexity of tessellation or triangularization of general polygons. In general, vectors are defined between an origin vertice to the remaining vertices thereby dividing the polygon into several randomly-oriented triangles. The number of randomly-oriented triangles is typically less than the number of orthogonally-oriented triangles required for tessellating a polygon according to prior art.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system for interpolating a polygon into a pixel grid having reference and orthogonal dimensions and corresponding reference and orthogonal coordinates, wherein the polygon has a plurality of vertices and is interpolated with a plurality of orthogonal rows of pixels in the pixel grid, the system comprising:

tessellation means receiving the vertices of the polygon for dividing the polygon into a plurality of simple polygons, each one of said simple polygons having a subset of the same vertices of the polygon, a main slope traversing the reference extent of each simple polygon in the reference dimension, up to two opposite slopes and up to three orthogonally oriented sides, wherein for each one of said plurality of simple polygons, said tessellation means calculates an initial reference value, an initial orthogonal value, an incremental orthogonal value, an initial width value and an incremental width value;

a reference interpolator receiving said initial reference value;

an orthogonal interpolator receiving said initial and incremental orthogonal values;

a width interpolator receiving said initial and incremental width values for providing a width count representing a number of pixels for each of the orthogonal rows of pixels;

a counter receiving said width count for each of the orthogonal rows of pixels, said counter decrementing said width count to zero and providing a terminal count line done signal indicating that the current orthogonal row is complete; and addressing means coupled to said reference, orthogonal and width interpolators and said counter for addressing each pixel of the polygon, wherein for each of said plurality of simple polygons, said addressing means asserts control signals to advance said interpolators to a next orthogonal row of pixels when said terminal count signal is asserted until all of the orthogonal rows are interpolated for each of said plurality of simple polygons.

2. The system of claim 1, wherein at least one of said plurality of simple polygons is a randomly-oriented triangle.

3. The system of claim 1, wherein at least one of said simple polygons has more than three sides.

4. The system of claim 1, wherein said tessellation means comprises a processor executing a software driver program.

5. An apparatus for interpolating a polygon into a pixel grid, the pixel grid having reference and orthogonal dimensions and corresponding coordinates and wherein the polygon is interpolated with a plurality of orthogonal rows of pixels relative to the main side of the polygon, the apparatus comprising:

calculating means for determining a simple polygon including a main side extending the entire length of the simple polygon in the reference dimension, up to two opposite sides and up to three orthogonally oriented sides, and for determining an initial reference value, an initial orthogonal value, an incremental orthogonal value, an initial width value and an incremental width value for the simple polygon;

a reference interpolator receiving said initial reference value for providing a reference coordinate for each of the orthogonal row of pixels;

an orthogonal interpolator receiving said initial orthogonal value and said incremental orthogonal value for providing an orthogonal coordinate for an initial pixel along the main side of each of the orthogonal row of pixels;

a width interpolator receiving said initial width value and said incremental width value for providing a width count representing a number of pixels for each of the orthogonal rows of pixels; and an address controller coupled to said reference interpolator, said orthogonal interpolator and said width interpolator and receiving a count value indicative of a number of orthogonal rows of pixels comprising the simple polygon for asserting address and control signals to control interpolation, said address controller comprising:

a width counter receiving said width count for each of the orthogonal rows of pixels and decrementing said width count to zero and then providing a terminal count line done signal indicating completion of a current row pixels; and addressing means coupled to said width counter and receiving said reference and orthogonal coordinates and said count value for asserting an address for each pixel of the simple polygon, said addressing means incrementing or decrementing said orthogonal coordinate until receiving said terminal count signal and then asserting control signals to said reference, orthogonal and width interpolators to advance to the next row of pixels until the total number of rows of pixels are completed as indicated by said count value.

6. The apparatus of claim 5, wherein the simple polygon includes a first and a second side opposite the main side forming a first and a second half of the simple polygon, further comprising:

said calculating means further determining a second incremental width value;

said width interpolator further comprising memory for receiving a second incremental width value, wherein said initial width value and said incremental value correspond to the first half and said second incremental value corresponds to the second half of the simple polygon; and wherein said addressing means asserts a half signal indicating the first half of the simple polygon is complete and said width interpolator thereafter uses said second incremental value to complete the simple polygon.

7. The apparatus of claim 6, further comprising:

said calculating means further determining a second width value corresponding to the second half of the simple polygon; and said memory further receiving said second width value;

wherein said addressing means further uses said second width value and said second incremental value to complete the second half of the simple polygon.

8. The apparatus of claim 6, wherein:

said count value includes a first and a second count value corresponding to the first and second halves of the simple polygon, respectively, wherein said first count value represents the number of orthogonal rows of pixels in the first half and wherein said second count value represents the number of orthogonal rows of pixels in the second half of the simple polygon; and said addressing means uses said first count value to complete the first half and said second count value to complete the second half of the simple polygon and further asserts said half signal upon completing the first half of the simple polygon.

9. The apparatus of claim 8, wherein said width interpolator further comprises:

said memory including a first register for receiving said incremental width value, a second register for receiving said second incremental width value and a third register for receiving said initial orthogonal width value;

a select circuit having inputs coupled to said first and second registers and having an output, said select circuit receiving said half signal for selecting between said first and second registers and providing the contents of the selected register to said output; and an adder circuit coupled to said select circuit and said third register for adding the contents of said third register to the output of said select circuit and providing the sum back into said third register.

10. The apparatus of claim 5, wherein said calculating means comprises a processor executing a software driver program.

11. The apparatus of claim 5, wherein said reference interpolator comprises:

a first register for receiving an incremental reference value;

a second register for receiving said initial reference value; and an adder circuit coupled to said first and second registers for adding the contents of said first and second registers and providing the sum back into said second register, wherein said second register provides said reference coordinate for each of the orthogonal row of pixels.

12. The apparatus of claim 5, wherein said orthogonal interpolator comprises:

a first register for receiving said incremental orthogonal value;

a second register for receiving said initial orthogonal value; and an adder circuit coupled to said first and second registers for adding the contents of said first and second registers and providing the sum back into said second register.

13. The apparatus of claim 5, wherein said width interpolator comprises:

a first register for receiving said incremental width value;

a second register for receiving said initial width value; and an adder circuit coupled to said first and second registers for adding the contents of said first and second registers and providing the sum back into said second register, wherein said second register provides said width values for each of the orthogonal row of pixels.

14. A method for interpolating a polygon into a pixel grid having reference and orthogonal dimensions and corresponding reference and orthogonal coordinates, wherein the polygon is interpolated with orthogonal rows of pixels, comprising the steps of:

determining a simple polygon including a main slope extending the entire length of the polygon in the reference dimension, up to two opposite sides and up to three orthogonally oriented sides;

calculating an initial reference value, an initial orthogonal value, an incremental orthogonal value, and initial width value and an incremental width value for the polygon;

for each orthogonal row, interpolating reference coordinates for initial pixels along the main slope of the polygon traversing the length of the polygon in the reference dimension;

for each orthogonal row, interpolating orthogonal coordinates for the initial pixels of the polygon;

for each orthogonal row, interpolating the initial and incremental width values to provide a width count; and for each pixel in each orthogonal row, decrementing the width count until reaching terminal count and then providing a terminal count signal indicating that the current orthogonal row is complete.

15. The method of claim 14, wherein said step of interpolating reference coordinates comprises the step of incrementing or decrementing the initial reference value by one for each orthogonal row.

16. The method of claim 14, wherein said step of interpolating orthogonal coordinates comprises the step of:

adding the incremental orthogonal value to the initial orthogonal value thereby providing an accumulated orthogonal coordinate for each orthogonal row.

17. The method of claim 14, wherein said step of interpolating a width value comprises the step of:

adding the incremental width value to the initial width value thereby providing an accumulated width count for each orthogonal row.

18. The method of claim 14, wherein the polygon includes a midpoint forming two half portions of the polygon, further comprising the steps of:

calculating a first incremental width value corresponding to the first half portion of the polygon and a second incremental width value corresponding to the second half portion of the polygon; and wherein said step of interpolating a width value comprises the steps of:

for each orthogonal row of the first half portion of the polygon, adding the first incremental width value to a width count initially being the initial width value thereby providing an accumulated width count; and for each orthogonal row of the second half portion of the polygon, adding the second incremental width value to the accumulated width count.

19. The method of claim 14, wherein the polygon includes a midpoint forming two half portions of the polygon, further comprising the steps of:

calculating a first initial width value and a first incremental width value corresponding to the first half portion of the polygon and a second initial width value a second incremental width value corresponding to the second half portion of the polygon; and wherein said step of interpolating a width value comprises the steps of:

for each orthogonal row of the first half portion of the polygon, adding the first incremental width value to a width count initially being the initial width value thereby providing an accumulated width count;

after the first half of the polygon is completed, loading the second initial width value into the accumulated width count; and for each orthogonal row of the second half portion of the polygon, adding the second incremental width value to the accumulated width value.

20. A method of interpolating a polygon having more than three sides into a pixel grid having reference and orthogonal dimensions and corresponding reference and orthogonal coordinates, wherein the polygon is interpolated with orthogonal rows of pixels, comprising the steps of:

dividing the polygon into a plurality of simple polygons, each having a main slope extending the entire length of the simple polygon in the reference dimension, up to two opposite slopes and up to three orthogonally-oriented sides;

for each simple polygon, determining an orthogonal component of the main slope;

for each orthogonal row of each simple polygon, interpolating reference coordinates for initial pixels along the main slope;

for each orthogonal row of each simple polygon, interpolating orthogonal coordinates for the initial pixels along the main slope;

for each orthogonal row of each simple polygon, interpolating a width value; and for each pixel in each orthogonal row of each simple polygon, decrementing said width value until reaching terminal count and providing a terminal count signal indicating that the current orthogonal row of the simple polygon is complete.

21. The method of claim 20, wherein said step of dividing the polygon comprises the steps of:

receiving vertices of the polygon; and determining a plurality of vectors between an initial vertex and the remaining vertices of the polygon.

22. The method of claim 20, wherein the simple polygons are randomly-oriented triangles.

\* \* \* \* \*